(12) United States Patent
Shoji et al.

(10) Patent No.: US 9,745,446 B2
(45) Date of Patent: Aug. 29, 2017

(54) RESIN COMPOSITION

(71) Applicant: TEIJIN LIMITED, Osaka-shi, Osaka (JP)

(72) Inventors: Shinichiro Shoji, Yamaguchi (JP); Masahiro Iwai, Yamaguchi (JP); Shunsuke Kanematsu, Yamaguchi (JP); Yuhei Ono, Yamaguchi (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/768,811

(22) PCT Filed: Mar. 20, 2014

(86) PCT No.: PCT/JP2014/059057
§ 371 (c)(1),
(2) Date: Aug. 19, 2015

(87) PCT Pub. No.: WO2014/157597
PCT Pub. Date: Oct. 2, 2014

(65) Prior Publication Data
US 2015/0376373 A1    Dec. 31, 2015

(30) Foreign Application Priority Data

Mar. 25, 2013 (JP) .................. 2013-062429
Jun. 6, 2013 (JP) .................. 2013-120034
Jan. 24, 2014 (JP) .................. 2014-011440

(51) Int. Cl.
*C08K 5/29*    (2006.01)
*D01F 6/62*    (2006.01)
*C08L 101/16*    (2006.01)

(52) U.S. Cl.
CPC ................ *C08K 5/29* (2013.01); *D01F 6/625* (2013.01); *C08K 2201/014* (2013.01); *C08L 101/16* (2013.01)

(58) Field of Classification Search
None
See application file for complete search history.

(56) References Cited

U.S. PATENT DOCUMENTS

| | | | |
|---|---|---|---|
| 3,886,104 A * | 5/1975 | Borman | ................ C08L 67/02 524/114 |
| 7,228,904 B2 | 6/2007 | Todd et al. | |
| 7,229,697 B2 * | 6/2007 | Kliesch | ...................... C08J 5/18 264/288.4 |
| 7,267,170 B2 | 9/2007 | Mang et al. | |

(Continued)

FOREIGN PATENT DOCUMENTS

| | | |
|---|---|---|
| JP | 2002-030208 A | 1/2002 |
| JP | 2004-359948 A | 12/2004 |

(Continued)

OTHER PUBLICATIONS

International Search Report of PCT/JP2014/059057 dated Jun. 10, 2014.

*Primary Examiner* — Robert S Loewe
(74) *Attorney, Agent, or Firm* — Sughrue Mion, PLLC

(57) ABSTRACT

Provided are a resin composition controlled such that after keeping under a severe environment as in high-temperature hot water or in hot water under chemically severe condition, such as an acidic or basic condition, etc., for a fixed period of time, it is quickly decomposed; and a structure thereof.

5 Claims, 2 Drawing Sheets

(56) References Cited

U.S. PATENT DOCUMENTS

| | | | |
|---|---|---|---|
| 7,275,596 B2 | 10/2007 | Willberg et al. | |
| 7,985,566 B2* | 7/2011 | Aoshima | C08G 63/16 435/145 |
| 9,428,521 B2* | 8/2016 | Suzuki | B01J 31/0239 |
| 2005/0233142 A1* | 10/2005 | Takahashi | D01F 1/10 428/364 |
| 2005/0245646 A1* | 11/2005 | Ohtsuka | C08K 5/1515 524/114 |
| 2009/0163674 A1* | 6/2009 | Sakane | C08L 67/00 525/438 |
| 2009/0176938 A1 | 7/2009 | Xu et al. | |
| 2009/0198020 A1* | 8/2009 | Sakane | C08L 67/00 525/411 |
| 2009/0318628 A1* | 12/2009 | Tanaka | C08G 63/912 525/419 |
| 2010/0104883 A1* | 4/2010 | Watanabe | B29C 55/023 428/480 |
| 2010/0130699 A1* | 5/2010 | Ikegame | C08L 67/04 525/411 |
| 2010/0197842 A1* | 8/2010 | Kamikawa | C08G 18/0895 524/195 |
| 2010/0292381 A1 | 11/2010 | Kamikawa | |
| 2011/0118395 A1* | 5/2011 | Kiuchi | C08K 3/22 524/116 |
| 2011/0215496 A1* | 9/2011 | Ogura | B29C 45/76 264/40.4 |
| 2011/0230599 A1* | 9/2011 | Deaner | B29C 47/0004 524/13 |
| 2011/0251384 A1 | 10/2011 | Shoji et al. | |
| 2011/0263762 A1 | 10/2011 | Matsuno et al. | |
| 2012/0041114 A1* | 2/2012 | Ikuno | C08L 67/04 524/115 |
| 2012/0108720 A1 | 5/2012 | Kitora et al. | |
| 2012/0184166 A1 | 7/2012 | Kurihara et al. | |
| 2012/0289625 A1* | 11/2012 | Matsuno | C07D 273/08 523/451 |
| 2012/0296017 A1* | 11/2012 | Tsuboi | C08J 3/201 524/94 |
| 2013/0090451 A1* | 4/2013 | Yoon | C08G 63/08 528/283 |
| 2013/0096243 A1* | 4/2013 | Yao | C08G 59/625 524/114 |
| 2013/0158175 A1* | 6/2013 | Ikuno | C08L 67/04 524/195 |
| 2013/0217815 A1* | 8/2013 | Deaner | C08K 3/22 524/195 |
| 2013/0263384 A1* | 10/2013 | Harada | D06M 13/224 8/115.52 |
| 2013/0287903 A1* | 10/2013 | Okutsu | C08L 67/04 426/106 |
| 2014/0084204 A1* | 3/2014 | Tanimoto | C08J 5/18 252/62.9 R |

FOREIGN PATENT DOCUMENTS

| | | |
|---|---|---|
| JP | 2009-062410 A | 3/2009 |
| JP | 2009-114448 A | 5/2009 |
| JP | 2009-126905 A | 6/2009 |
| JP | 2009-173582 A | 8/2009 |
| JP | 2009-227784 A | 10/2009 |
| JP | 2010-001338 A | 1/2010 |
| JP | 2010-126580 A | 6/2010 |
| JP | 2010-254899 A | 11/2010 |
| JP | 2011-523422 A | 8/2011 |
| JP | 2011-256471 A | 12/2011 |
| JP | 2012-012560 A | 1/2012 |
| JP | 2012-246338 A | 12/2012 |
| JP | 2013-060490 A | 4/2013 |
| WO | 2009/081558 A1 | 7/2009 |
| WO | 2010/053167 A1 | 5/2010 |
| WO | 2010/071211 A1 | 6/2010 |
| WO | 2011/001763 A1 | 1/2011 |
| WO | 2011/004885 A1 | 1/2011 |
| WO | 2012/128006 A1 | 9/2012 |

* cited by examiner

RESIN COMPOSITION

CROSS REFERENCE TO RELATED APPLICATIONS

This is a National Stage of International Application No. PCT/JP2014/059057 filed Mar. 20, 2014 (claiming priority based on Japanese Patent Application No. 2013-062429 filed Mar. 25, 2013, Japanese Patent Application No. 2013-120034 filed Jun. 6, 2013, and Japanese Patent Application No. 2014-011440 filed Jan. 24, 2014), the contents of which are incorporated herein by reference in their entirety.

TECHNICAL FIELD

The present invention relates to a resin composition containing a resin containing, as a main component, a water-soluble monomer and having autocatalysis (component A) and a hydrolysis regulator (component B).

BACKGROUND ART

In recent years, from the purpose of global environmental protection, resins which are easily decomposed under the natural environment are watched and studied in the world. As the resins which are easily decomposed under the natural environment, biodegradable polymers represented by aliphatic polyesters, such as polylactic acid, polyglycolic acid, poly(3-hydroxybutyrate), polycaprolactone, etc., are known.

Above all, polylactic acid is a polymer material that is high in biological safety and environmentally friendly because it is made of, as a raw material, from lactic acid obtained from a plant-derived raw material, or a derivative thereof. For that reason, utilization as a general-purpose polymer is investigated, and utilization as films, fibers, injection molded articles, and the like is investigated.

Recently, paying attention to easy decomposability of those resins and water solubility of decomposed monomers, practical use for excavation technology in the oil field is investigated (Patent Literatures 1 to 3). In this application, it is required that after keeping the weight and shape of a resin in hot water for a fixed period of time, the resin is quickly decomposed (see FIG. 1). However, in general, since aliphatic polyesters and the like are inferior in hydrolysis resistance, though they are usable up to a medium temperature of about 120° C., there is involved such a problem that they are immediately decomposed in high-temperature hot water (see FIG. 2), so that a desired performance cannot be exhibited.

Slowly decomposable resins, such as aromatic polyesters, etc., are not quickly decomposed even in hot water (see FIG. 3), and furthermore, there is involved such a problem that monomers generated by decomposition react with other components of the foregoing application and are deposited in water (Patent Literature 4). With respect to the high temperature, there are various definitions, such as "127° C. to 193° C." described in the report: U.S. Shale Gas, published in 2008 by Halliburton Company, "149° C. or higher" described in *Oil and Gas Review*, 2002.5, published by Japan Oil, Gas and Metals National Corporation, etc., and in general, the high temperature is considered to be higher than "125° C. to 150° C.". Incidentally, in the present invention, a temperature higher than 135° C. is referred to as "high temperature".

Meanwhile, in order to enhance the hydrolysis resistance of aliphatic polyesters and the like, there is already proposed a method in which a hydrolysis regulator, such as a carbodiimide compound, etc., is used, and an acidic group generated at the early stage and by decomposition in the resin is sealed, thereby inhibiting the hydrolysis (Patent Literatures 4 to 6).

The acidic group generated by hydrolysis of the aliphatic polyester, such as a carboxyl group, etc., becomes an autocatalyst to promote the hydrolysis, and therefore, it is confirmed that by immediately sealing this by a carbodiimide compound or the like, the hydrolysis resistance under the moist heat environment at about 50 to 120° C. is enhanced.

However, with respect to the hydrolysis inhibition in hot water at a higher temperature than 135° C., there are not made sufficient investigations from the viewpoints of resin or hydrolysis regulator.

In the light of the above, it is the actual situation that a resin composition exhibiting a desired performance as shown in FIG. 1 in hot water at a higher temperature than 135° C. has not been obtained yet in the excavation technology in the oil field.

In addition, in the application of the excavation technology in the oil field, it is required that after keeping the weight and shape of a resin in hot water under a chemically severe condition, such as an acidic or basic condition, etc., for a fixed period of time, the resin is quickly decomposed (see FIG. 5). However, in general, since aliphatic polyesters and the like are inferior in hydrolysis resistance, though they are usable in approximately neutral hot water, they are quickly decomposed in strongly acidic or basic hot water (see FIG. 6), so that there is involved such a problem that a desired performance cannot be exhibited.

In addition, slowly decomposable resins, such as aromatic polyesters, etc., are not quickly decomposed even in strongly acidic or basic hot water (see FIG. 3), and furthermore, there is involved such a problem that monomers generated by decomposition react with other components of the foregoing application and are deposited in water.

CITATION LIST

Patent Literature

Patent Literature 1: JP-A-2009-114448
Patent Literature 2: U.S. Pat. No. 7,267,170
Patent Literature 3: U.S. Pat. No. 7,228,904
Patent Literature 4: U.S. Pat. No. 7,275,596
Patent Literature 5: JP-A-2012-012560
Patent Literature 6: JP-A-2009-173582
Patent Literature 7: JP-A-2002-30208

SUMMARY OF INVENTION

Technical Problem

An object of a first invention of the present application is to solve the above-described problems of the background art and to provide a resin composition which is quickly decomposed after keeping the weight and shape of the resin in hot water at a higher temperature than 135° C. for a fixed period of time.

In addition, an object of a second invention of the present application is to provide a resin composition which is quickly decomposed after keeping the weight and shape of the resin in hot water under a chemically severe condition, such as an acidic or basic condition, etc., for a fixed period of time.

Solution to Problem

The present inventors made extensive and intensive investigations regarding a resin composition which is quickly decomposed after keeping the weight and shape of the resin in hot water at a higher temperature than 135° C. for a fixed period of time.

As a result, it has been found that in the case where a concentration of an acidic group can be kept low by using a resin containing, as a main component, a water-soluble monomer and having autocatalysis, hydrolysis is inhibited during that time, and a decrease of the molecular weight becomes gentle, so that the weight and shape are kept, and at a point of time when a concentration of the acidic group cannot be kept low, decomposition of the resin is rapidly promoted (see FIG. 4).

As a result of making further investigations, it has been found that when a hydrolysis regulator in which not only water resistance at 120° C. is 95% or more, but also reactivity with an acidic group at 190° C. is 50% or more is used for sealing the acidic group, a concentration of the acidic group can be efficiently kept low in hot water at a higher temperature than 135° C., and a timing of rapid decomposition of the resin can be controlled according to its addition amount.

That is, it has been found that when a resin containing, as a main component, a water-soluble monomer and having autocatalysis and a hydrolysis regulator in which not only water resistance at 120° C. is 95% or more, but also reactivity with an acidic group at 190° C. is 50% or more are compounded, the resultant is quickly decomposed after keeping the weight and shape of the resin in hot water at a higher temperature than 135° C. for a fixed period of time, leading to accomplishment of the present invention.

Specifically, according to the present invention, the following resin composition is provided.
(1) A resin composition containing a resin containing, as a main component, a water-soluble monomer and having autocatalysis (component A) and a hydrolysis regulator (component B), the resin composition satisfying any one of the following A1 to A3:
A1: In hot water at an arbitrary temperature of 135° C. to 160° C., after 3 hours, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less;
A2: In hot water at an arbitrary temperature of 160° C. to 180° C., after 1 hour, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less; and
A3: In hot water at an arbitrary temperature of 180° C. to 220° C., after, 1 hour, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less.

The following are also included in the present invention.
(2) The resin composition as set forth above in (1), wherein the component B has water resistance at 120° C. of 95% or more and reactivity with an acidic group at 190° C. of 50% or more.
(3) The resin composition as set forth above in (1) or (2), wherein in hot water at an arbitrary temperature of 135° C. to 220° C., after 100 hours, the weight of the water-insoluble matter of the resin composition is 10% or less.

(4) The resin composition as set forth above in any one of (1) to (3), wherein a heat deformation temperature of the resin composition is 135° C. to 300° C.
(5) The resin composition as set forth above in any one of (1) to (4), wherein the component A is a polyester.
(6) The resin composition as set forth above in (5), wherein a main chain of the component A is composed mainly of a lactic acid unit represented by the following formula (1):

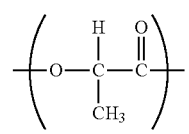

(7) The resin composition as set forth above in (6), wherein the component A contains a stereocomplex phase formed of poly(L-lactic acid) and poly(D-lactic acid).
(8) The resin composition as set forth above in any one of (1) to (7), wherein the component B is a carbodiimide compound.
(9) The resin composition as set forth above in (8), wherein the component B is a carbodiimide compound represented by the following formula (2):

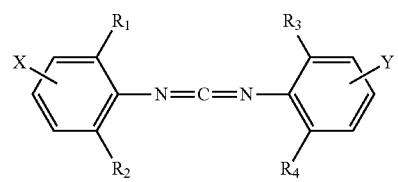

(In the formula, each of $R_1$ to $R_4$ is independently an aliphatic group having 1 to 20 carbon atoms, an alicyclic group having 3 to 20 carbon atoms, an aromatic group having 5 to 15 carbon atoms, or a combination thereof, and may contain a hetero atom; each of X and Y is independently a hydrogen atom, an aliphatic group having 1 to 20 carbon atoms, an alicyclic group having 3 to 20 carbon atoms, an aromatic group having 5 to 15 carbon atoms, or a combination thereof, and may contain a hetero atom; and the respective aromatic rings may be bonded to each other via a substituent to form a cyclic structure.)
(10) The resin composition as set forth above in (9), wherein the component B is bis(2,6-diisopropylphenyl)carbodiimide
(11) The resin composition as set forth above in (8), wherein the component B is a carbodiimide compound composed of a repeating unit represented by the following formula (3):

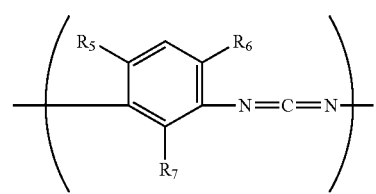

(In the formula, each of $R_5$ to $R_7$ is independently an aliphatic group having 1 to 20 carbon atoms, an alicyclic group having 3 to 20 carbon atoms, an aromatic group having 5 to 15 carbon atoms, or a combination thereof, and may contain a hetero atom.)

(12) A molded article comprising the resin composition as set forth above in any one of (1) to (11).

(13) A fiber comprising the resin composition as set forth above in any one of (1) to (11).

In addition, the present inventors also made extensive and intensive investigations regarding a resin composition which is quickly decomposed after keeping the weight and shape of the resin in hot water under a chemically severe condition, such as an acidic or basic condition, etc., for a fixed period of time.

As a result, it has been found that in the case where a concentration of an acidic group in a polymer can be kept low by using an aliphatic polyester containing, as a main component, a water-soluble monomer, hydrolysis is inhibited during that time, and a decrease of the molecular weight becomes gentle, so that the weight and shape of a resin are kept to some extent during that time, and at a point of time when a concentration of the acidic group in the polymer cannot be kept low, decomposition of the resin is rapidly promoted (see FIG. 8).

As a result of making further investigations, it has been found that when a hydrolysis regulator satisfying specified requirements is used for sealing the acidic group, a concentration of the acidic group can be efficiently kept low in hot water under a chemically severe condition, such as an acidic or basic condition, etc., and a timing of rapid decomposition of the resin can be controlled according to its addition amount.

Then, it has been found that when an aliphatic polyester containing, as a main component, a water-soluble monomer is compounded with a hydrolysis regulator whose reactivity with the acidic group satisfies specified requirements, the resultant is quickly decomposed after keeping the weight and shape of a resin in hot water under a chemically severe condition, such as an acidic or basic condition, etc., for a fixed period of time, leading to accomplishment of a second invention of the present application.

Specifically, according to the second invention of the present application, the following resin composition is provided.

(14) A resin composition including an aliphatic polyester containing, as a main component, a water-soluble monomer (component C) and a hydrolysis regulator having reactivity with an acidic group in a 15% hydrochloric acid aqueous solution at 100° C. of 30% or more (component D), the resin composition satisfying any one of the following J1 to J2:

J1: In the 15% hydrochloric acid aqueous solution at 100° C., after 6 hours, a weight average molecular weight retention rate of the resin composition is 50% or more, and after 24 hours, a weight of a water-insoluble matter of the resin composition is 50% or less; and J2: In the 15% hydrochloric acid aqueous solution at 120° C., after 1 hour, a weight average molecular weight retention rate of the resin composition is 50% or more, and after 24 hours, a weight of a water-insoluble matter of the resin composition is 50% or less.

In addition, the following are also included in the second invention of the present application.

(15) The resin composition as set forth above in (14), wherein after 72 hours, the weight of the water-insoluble matter of the resin composition is 1% or less.

(16) The resin composition asset forth above in (14) or (15), wherein a main chain of the component A is composed mainly of a lactic acid unit represented by the following formula (1):

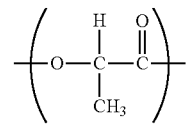

(17) The resin composition as set forth above in any one of (14) to (16), wherein the hydrolysis regulator (component D) is at least one member selected from a carbodiimide compound and an epoxy compound.

(18) A molded article comprising the resin composition as set forth above in any one of (14) to (16).

Advantageous Effects of Invention

The resin composition of the first invention of the present invention can be quickly decomposed after keeping the weight and shape of the resin in hot water at a higher temperature than 135° C. for a fixed period of time.

Furthermore, since the resin containing, as a main component, a water-soluble monomer and having autocatalysis is used, the resin composition is efficiently dissolved in high-temperature hot water after decomposition, and it is possible to significantly reduce deposition or the like to be caused due to a reaction with other component, which is considered to be problematic in a part of aromatic polyesters. By using the hydrolysis regulator in which not only water resistance at 120° C. is 95% or more, but also reactivity with an acidic group at 190° C. is 50% or more in order to seal the acidic group, steady decomposition inhibition can be achieved, and a timing of decomposition of the resin in high-temperature hot water can be controlled according to its addition amount.

For that reason, the resin composition of the present invention exhibits a desired performance in the excavation technology in the oil field and can be suitably used as resin molded articles of this application, especially fibers.

The resin composition of the second invention of the present application can be quickly decomposed after keeping the weight and shape of the resin in hot water under a chemically severe condition, such as an acidic or basic condition, etc., for a fixed period of time.

Furthermore, since the aliphatic polyester containing, as a main component, a water-soluble monomer is used, the resin composition is efficiently dissolved in water after decomposition, and it is possible to significantly reduce deposition or the like to be caused due to a reaction with other component, which is considered to be problematic in a part of aromatic polyesters. By using the hydrolysis regulator satisfying the requirement specified in the present application in order to seal the acidic group, the hydrolysis regulator continues to exhibit a decomposition inhibition performance at a fixed level so long as it exists in the resin composition, and therefore, a timing of decomposition of the resin in high-temperature hot water can be controlled according to the addition amount of the hydrolysis regulator.

For that reason, the resin composition of the present invention exhibits a desired performance in the excavation technology in the oil field and can be suitably used as resin molded articles of this application.

DESCRIPTION OF EMBODIMENTS

Figure 1:
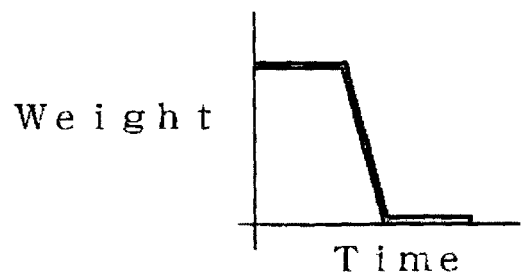
FIG. 1 is an image view in which in the case of using a resin in hot water at a higher temperature than 135° C., the resin is quickly decomposed after keeping the weight and shape of the resin for a fixed period of time and shows a behavior which is achieved in the resin composition of the first invention of the present application.
Figure 2:
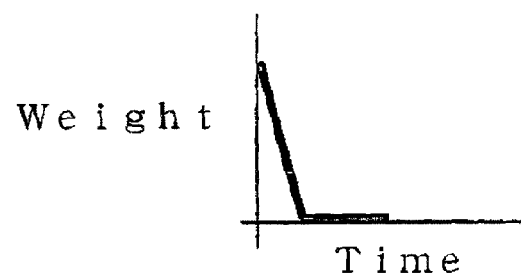
FIG. 2 is an image view in which in the case of using a resin in hot water at a higher temperature than 135° C., decomposition is rapidly advanced from the early stage and is concerned with a behavior in a general aliphatic polyester.
Figure 3:
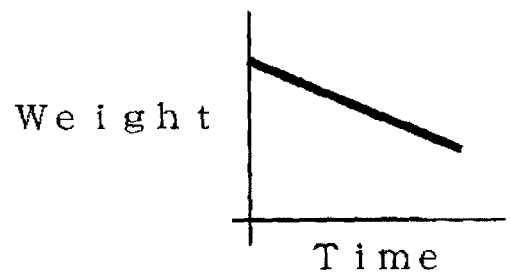
FIG. 3 is an image view in which in the case of using a resin in hot water at a higher temperature than 135° C., decomposition is rapidly advanced from the early stage and is concerned with a behavior in a general aromatic polyester.
Figure 4:
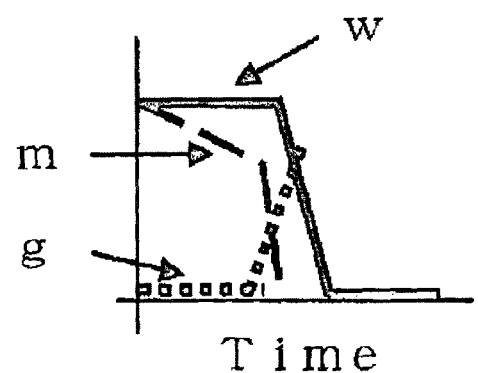
FIG. 4 is an image view in which in the case of using a resin in hot water at a higher temperature than 135° C., changes in a molecular weight (m) and an acidic group amount (g) necessary for achieving a behavior of a change of a weight (w) of the resin as in FIG. 1 are expressed and is concerned with a behavior which is achieved in the resin composition of the first invention of the present application.
Figure 5:
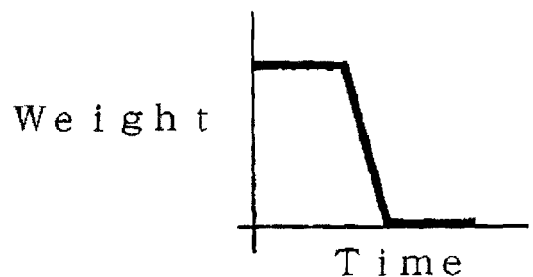
FIG. 5 is an image view in which in the case of using a resin in hot water under a chemically severe condition, such as an acidic or basic condition, etc., the resin is quickly decomposed after keeping the weight and shape of the resin for a fixed period of time and is concerned with a behavior which is achieved in the resin composition of the second invention of the present application.
Figure 6:
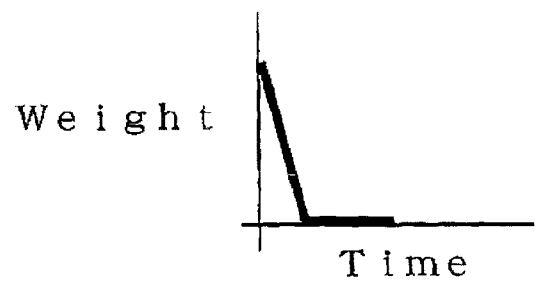
FIG. 6 is an image view in which in the case of using a resin in hot water under a chemically severe condition, such as an acidic or basic condition, etc., decomposition is rapidly advanced from the early stage and is concerned with a behavior in a general aliphatic polyester.
Figure 7:
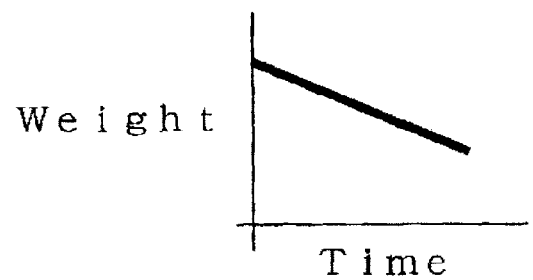
FIG. 7 is an image view in which in the case of using a resin in hot water under a chemically severe condition, such as an acidic or basic condition, etc., decomposition is rapidly advanced from the early stage and is concerned with a behavior in a general aromatic polyester.
Figure 8:
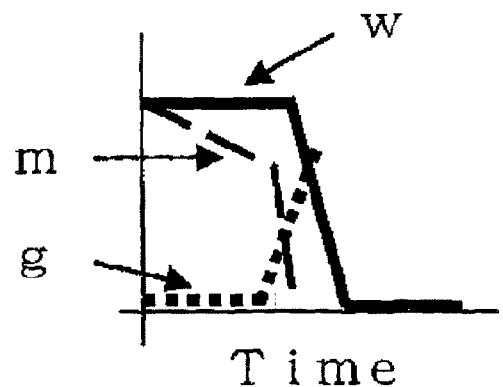
FIG. 8 is an image view in which in the case of using a resin in hot water under a chemically severe condition, such as an acidic or basic condition, etc., changes in a molecular weight (m) and an acidic group amount (g) necessary for achieving a behavior of a change of a weight (w) of the resin as in FIG. 5 are expressed and is concerned with a behavior which is achieved in the resin composition of the second invention of the present application.

The first invention of the present application is hereunder explained in detail.
1. A resin composition containing a resin containing, as a main component, a water-soluble monomer and having autocatalysis (component A) and a hydrolysis regulator (component B), the resin composition satisfying any one of the following A1 to A3:
A1: In hot water at an arbitrary temperature of 135° C. to 160° C., after 3 hours, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less;
A2: In hot water at an arbitrary temperature of 160° C. to 180° C., after 2 hour, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less; and
A3: In hot water at an arbitrary temperature of 180° C. to 220° C., after 1 hour, not only a resin composition-derived acidic group concentration is 30 equivalents/ton or less, but also a weight of a water-insoluble matter of the resin composition is 50% or more, and after 24 hours, the weight of the water-insoluble matter of the resin composition is 50% or less.

<Resin Containing, as a Main Component, a Water-Soluble Monomer and Having Autocatalysis (Component A)>

In the present invention, in the resin containing, as a main component, a water-soluble monomer and having autocatalysis (component A), the monomer generated by decomposition exhibits solubility in water, and the resin in which an acidic group generated by decomposition has autocatalysis, or at least a part of ends of the resin is sealed by the component B.

The term "water-soluble" referred to herein means that the solubility in water at 25° C. is 0.1 g/L or more. From the viewpoint that the resin composition to be used does not remain in water after decomposition, the solubility in water of the water-soluble monomer is preferably 1 g/L or more, more preferably 3 g/L or more, and still more preferably 5 g/L or more.

The "main component" means that it occupies 90 mol % or more of the constituent components. A proportion of the main component is preferably 95 to 100 mol %, and more preferably 98 to 100 mol %.

As the component A, at least one member selected from the group consisting of polyesters, polyamides, polyamide-imides, polyimides, polyurethanes, and polyester amides is exemplified. Preferably, polyesters are exemplified.

Examples of the polyester include polymers or copolymers obtained by polycondensing at least one member selected from a dicarboxylic acid or an ester forming derivative thereof, a diol or an ester forming derivative thereof, a hydroxycarboxylic acid or an ester forming derivative thereof, and a lactone. Preferably, polyesters composed of a hydroxycarboxylic acid or an ester forming derivative thereof are exemplified. More preferably, aliphatic polyesters composed of a hydroxycarboxylic acid or an ester forming derivative thereof are exemplified.

Such a thermoplastic polyester may contain a crosslinking structure generated by being treated with a radical generating source, for example, an energy active ray, an oxidizing agent, etc., from the standpoint of moldability or the like.

Examples of the dicarboxylic acid or its ester forming derivative include aromatic dicarboxylic acids, such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyl ether dicarboxylic acid, 5-tetrabutylphosphonium isophthalic acid, 5-sodiumsulfoisophthalic acid, etc. Aliphatic dicarboxylic acids, such as oxalic acid, succinic acid, adipic acid, sebacic acid, azelaic acid, dodecanedioic acid, malonic acid, glutaric acid, dimer acid, etc., are also exemplified. Alicyclic dicarboxylic acids, such as 1,3-cyclohexanedicarboxylic acid, 1,4-cyclohexanedicarboxylic acid, etc., are also exemplified. Ester forming derivatives thereof are also exemplified.

Examples of the diol or its ester forming derivative include aliphatic glycols having 2 to 20 carbon atoms, namely ethylene glycol, 1,3-propanediol, propylene glycol, 1,4-butanediol, neopentyl glycol, 1,5-pentandiol, 1,6-hexanediol, decamethylene glycol, cyclohexanedimethanol, cyclohexanediol, dimer diol, etc.

Long-chain glycols having a molecular weight of 200 to 100,000, namely polyethylene glycol, poly(1,3-propylene glycol), poly(1,2-propylene glycol), polytetramethylene glycol, etc., are also exemplified. Aromatic dioxy compounds, namely 4,4'-dihydroxybiphenyl, hydroquinone, tert-butyl-hydroquinone, bisphenol A, bisphenol S, bisphenol F, etc., are also exemplified. Ester forming derivatives thereof are also exemplified.

Examples of the hydroxycarboxylic acid include glycolic acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, and ester forming derivatives thereof, and the like. Examples of the lactone include caprolactone, valerolactone, propiolactone, undecalactone, 1,5-oxepan-2-one, and the like.

Examples of the aliphatic polyester include polymers containing an aliphatic hydroxycarboxylic acid as a main constituent component, polymers obtained by polycondensing an aliphatic multivalent carboxylic acid or an ester forming derivative thereof and an aliphatic polyhydric alcohol as main constituent components, and copolymers thereof.

Examples of the polymer containing an aliphatic hydroxycarboxylic acid as a main constituent component may include polycondensates of glycolic acid, lactic acid, hydroxypropionic acid, hydroxybutyric acid, hydroxyvaleric acid, hydroxycaproic acid, or the like, and copolymers thereof. Above all, polyglycolic acid, polylactic acid, poly(3-hydroxycarbonbutyric acid), poly(4-polyhydroxybutyric acid), poly(3-hydroxyhexanoic acid), polycaprolactone, and copolymers thereof, and the like are exemplified. In particular, poly(L-lactic acid), poly(D-lactic acid), stereocomplex polylactic acid, and racemic polylactic acid are exemplified.

Polymers containing an aliphatic multivalent carboxylic acid and an aliphatic polyhydric alcohol as main constituent components are exemplified. Examples of the multivalent carboxylic acid include aliphatic dicarboxylic acids, such as oxalic acid, succinic acid, adipic acid, sebacic acid, azelaic acid, dodecanedioic acid, malonic acid, glutaric acid, dimer acid, etc.; alicyclic dicarboxylic acid units, such as 1,3-cyclohexanedicarboxylic acid, 1,4-cyclohexanedicarboxylic acid, etc.; and ester forming derivatives thereof. Examples of the diol component include aliphatic glycols having 2 to 20 carbon atoms, such as ethylene glycol, 1,3-propanediol, propylene glycol, 1,4-butanediol, neopentyl glycol, 1,5-pentanediol, 1,6-hexanediol, decamethylene glycol, cyclohexanedimethanol, cyclohexanediol, dimer diol, etc. Long-chain glycols having a molecular weight of 200 to 100,000, namely polyethylene glycol, poly(1,3-proylene glycol), poly(1,2-propylene glycol), and polytetramethylene glycol are exemplified. Specifically, polyethylene adipate, polyethylene succinate, polybutylene adipate, polybutylene succinate, and copolymers thereof, and the like are exemplified.

The polyester can be produced by well-known methods (for example, methods described in *Saturated Polyester Resin Handbook* (written by Kazuo Yuki, Nikkan Kogyo Shimbun Ltd. (published on Dec. 22, 1989)).

Furthermore, examples of the polyester include, in addition to the above-described polyesters, unsaturated polyester resins obtained by copolymerizing an unsaturated multivalent carboxylic acid or an ester forming derivative; and polyester elastomers containing a low melting-point polymer segment.

Examples of the unsaturated multivalent carboxylic acid include maleic anhydride, tetrahydromaleic anhydride, fumaric acid, endomethylene tetrahydromaleic anhydride, and the like. In such an unsaturated polyester, for the purpose of controlling its curing properties, various monomers are added, and the unsaturated polyester is cured by means of thermal curing, radical curing, or curing with an active energy ray, such as light, electron beams, etc., and then molded.

Furthermore, in the present invention, the polyester may also be a polyester elastomer obtained by copolymerizing a soft component. The polyester elastomer is a block copolymer composed of a high melting-point polyester segment and a low melting-point polymer segment having a molecular weight of 400 to 6,000 as described in publicly known literatures, for example, JP-A-11-92636, or the like. In the case of forming a polymer by using only a high melting-point polyester segment, its melting point is 150° C. or higher, and such a polymer can be suitably used.

The polyester is preferably a polyester composed of a hydroxycarboxylic acid or an ester forming derivative thereof. An aliphatic polyester composed of a hydroxycarboxylic acid or an ester forming derivative thereof is more preferred. Furthermore, it is especially preferred that the aliphatic polyester is poly(L-lactic acid), poly(D-lactic acid), or stereocomplex polylactic acid.

Here, as for the polylactic acid, its main chain is composed of a lactic acid unit represented by the following formula (1). In this specification, the term "mainly" means that a proportion of the unit is preferably 90 to 100 mol %, more preferably 95 to 100 mol %, and still more preferably 98 to 100 mol %.

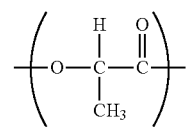

(1)

The lactic acid unit represented by the formula (1) includes an L-lactic acid unit and a D-lactic acid unit, which are an optical isomer to each other. It is preferred that a main chain of the polylactic acid is mainly an L-lactic acid unit, a D-lactic acid unit, or a combination thereof.

The polylactic acid is preferably poly(D-lactic acid) in which a main chain thereof is composed mainly of a D-lactic acid unit, or poly(L-lactic acid) in which a main chain thereof is composed mainly of an L-lactic acid unit. A proportion of other unit constituting the main chain is in the range of preferably 0 to 10 mol %, more preferably 0 to 5 mol %, and still more preferably 0 to 2 mol %.

Examples of the other unit constituting the main chain include units derived from a dicarboxylic acid, a polyhydric alcohol, a hydroxycarboxylic acid, a lactone, or the like.

Examples of the dicarboxylic acid include succinic acid, adipic acid, azelaic acid, sebacic acid, terephthalic acid, isophthalic acid, and the like. Examples of the polyhydric alcohol include aliphatic polyhydric alcohols, such as ethylene glycol, propylene glycol, butanediol, pentanediol, hexanediol, octanediol, glycerin, sorbitan, neopentyl glycol, diethylene glycol, triethylene glycol, polyethylene glycol, polypropylene glycol, etc.; aromatic polyhydric alcohols, such as bisphenol having ethylene oxide added thereto, etc.; and the like. Examples of the hydroxycarboxylic acid include glycolic acid, hydroxybutyric acid, and the like. Examples of the lactone include glycolide, ε-caprolactone, β-propiolactone, δ-butyrolactone, β- or γ-butyrolactone, pivalolactone, δ-valerolactone, and the like.

For the purpose of making both mechanical physical properties of a molded article and moldability compatible with each other, a weight average molecular weight of the polylactic acid is in the range of preferably 50,000 to 500,000, more preferably 80,000 to 350,000, and still more preferably 120,000 to 250,000. The weight average molecular weight is a value obtained by measurement by means of gel permeation chromatography (GPC) and conversion into standard polystyrene.

When the polylactic acid (component A) is poly(D-lactic acid) or poly(L-lactic acid) and is a homo-phase polylactic acid, it is preferred that when measured by a differential scanning calorimeter (DSC), the polylactic acid has a crystal melting peak (Tmh) at between 150 to 190° C. and a crystal melting heat (ΔHmsc) of 10 J/g or more. When the foregoing ranges of the crystal melting point and crystal melting heat are satisfied, the heat resistance can be increased.

The main chain of the polylactic acid is preferably stereocomplex polylactic acid containing a stereocomplex phase formed of a poly(L-lactic acid) unit and a poly(D-lactic acid) unit. It is preferred that when measured by a differential scanning calorimeter (DSC), the stereocomplex polylactic acid exhibits a crystal melting peak of 190° C. or higher.

In the stereocomplex polylactic acid, a stereocomplex crystallization degree (S) as prescribed by the following equation (i) is preferably 90 to 100%.

$$S=[\Delta Hms/(\Delta Hmh+\Delta Hms)]\times 100 \quad (i)$$

(Here, ΔHms represents a melting enthalpy of the stereocomplex-phase polylactic acid crystal, and ΔHmh represents a melting enthalpy of the polylactic acid homo-phase crystal.)

The crystallization degree of the stereocomplex polylactic acid, particularly the crystallization degree by the XRD measurement is in the range of preferably at least 5%, more preferably 5 to 60%, still more preferably 7 to 60%, and especially preferably 10 to 60%.

The crystal melting point of the stereocomplex polylactic acid is in the range of preferably 190 to 250° C., and more preferably 200 to 230° C. The crystal melting enthalpy of the stereocomplex polylactic acid by the DSC measurement is in the range of preferably 20 J/g or more, more preferably 20 to 80 J/g, and still more preferably 30 to 80 J/g. When the crystal melting point of the stereocomplex polylactic acid is lower than 190° C., the heat resistance is worsened. When it is higher than 250° C., molding at a high temperature of 250° C. or higher is needed, so that there may be the case where it is difficult to inhibit the heat decomposition of the resin. In consequence, it is preferred that when measured by a differential scanning calorimeter (DSC), the resin composition of the present invention exhibits a crystal melting peak of 190° C. or higher.

In the stereocomplex polylactic acid, a weight ratio of poly(D-lactic acid) to poly(L-lactic acid) is in the range of preferably 90/10 to 10/90, more preferably 80/20 to 20/80, still more preferably 30/70 to 70/30, and especially preferably 40/60 to 60/40. Theoretically, it is preferred that the weight ratio is close to 1/1 as far as possible.

A weight average molecular weight of the stereocomplex polylactic acid is in the range of preferably 50,000 to 500,000, more preferably 80,000 to 350,000, and still more preferably 120,000 to 250,000. The weight average molecular weight is a value obtained by measurement by means of gel permeation chromatography (GPC) and conversion into standard polystyrene.

The poly(L-lactic acid) and poly(D-lactic acid) can be produced by a conventionally known method. For example, the poly(L-lactic acid) and poly(D-lactic acid) can be produced by subjecting L-lactide or D-lactide to ring-opening polymerization, respectively in the presence of a metal-containing catalyst. The poly(L-lactic acid) and poly(D-lactic acid) can also be produced by subjecting a low-molecular weight polylactic acid containing a metal-containing catalyst, after being optionally crystallized or without being crystallized, to solid-phase polymerization under reduced pressure or by pressurization from atmospheric pressure in the presence or absence of an inert gas stream. Furthermore, the poly(L-lactic acid) and poly(D-lactic acid) can be produced by a direct polymerization method of subjecting lactic acid to dehydration condensation in the presence or absence of an organic solvent.

The polymerization reaction can be carried out in a conventionally known reaction vessel, and for example, in the ring-opening polymerization or direct polymerization method, a vertical reactor or horizontal reactor equipped with a high viscosity stirring blade, such as a helical ribbon blade, etc., can be used alone or in parallel. All of a batch type, a continuous type, and a semi-batch type may be used, or these may be combined.

An alcohol may be used as a polymerization initiator. It is preferred that such an alcohol does not hinder the polymerization of polylactic acid and is nonvolatile, and for example, decanol, dodecanol, tetradecanol, hexadecanol, octadecanol, ethylene glycol, trimethylolpropane, pentaerythritol, or the like can be suitably used. It may be said that an embodiment in which the polylactic acid prepolymer used in the solid-phase polymerization method is previously crystallized is preferred from the standpoint of preventing the fusion of resin pellets. The prepolymer is polymerized in a state of solid at a temperature in the range of a glass transition temperature of the prepolymer or higher and lower than a melting point thereof in a fixed vertical reaction vessel or horizontal reaction vessel, or a reaction vessel (rotary kiln, etc.) in which the vessel itself rotates, such as a tumbler or a kiln.

Examples of the metal-containing catalyst include fatty acid salts, carbonates, sulfates, phosphates, oxides, hydroxides, halides, alcoholates, and like of an alkali metal, an alkaline earth metal, a rare-earth element, a transition metal, aluminum, germanium, tin, antimony, titanium, etc. Above all, fatty acid salts, carbonates, sulfates, phosphates, oxides, hydroxides, halides, and alcoholates containing at least one metal selected from tin, aluminum, zinc, calcium, titanium, germanium, manganese, magnesium, and a rare-earth element are preferred.

Specifically, from the standpoints of catalytic activity and less occurrence of a side reaction, tin-containing compounds, such as stannous chloride, stannous bromide, stannous iodide, stannous sulfate, stannic oxide, tin myristate, tin octylate, tin stearate, tetraphenyltin, etc., are exemplified as a preferred catalyst. Above all, tin(II) compounds, specifically diethoxytin, dinonyloxytin, tin(II) myristate, tin(II) octylate, tin(II) stearate, tin(II) chloride, and the like, are suitably exemplified.

A use amount of the catalyst is $0.42 \times 10^{-4}$ to $100 \times 10^{-4}$ (mol) per kg of the lactide, and furthermore, taking into consideration the reactivity, the color tone of the obtained polylactide, and the stability, the catalyst is used in an amount of preferably $1.68 \times 10^{-4}$ to $42.1 \times 10^{-4}$ (mol), and especially preferably $2.53 \times 10^{-4}$ to $16.8 \times 10^{-4}$ (mol).

It is preferred that the metal-containing catalyst used for the polymerization of polylactic acid is inactivated with a conventionally known deactivator prior to the use for polylactic acid. Examples of such a deactivator include organic ligands consisting of a group of chelate ligands having an imino group and capable of coordinating to the polymerization metal catalyst.

Low oxidation number phosphoric acids having an acid number of 5 or less, such as dihydride oxophosphoric acid (I), dihydride tetraoxodiphosphoric acid (II, II), hydride trioxophosphoric acid (III), dihydride pentaoxodiphosphoric acid (III), hydride pentaoxodiphosphoric acid (II, IV), dodecaoxohexaphosphoric acid (III), hydride octaoxotriphosphoric acid (III, IV, IV), octaoxotriphosphoric acid (IV, III, IV), hydride hexaoxodiphosphoric acid (III, V), hexaoxodiphosphoric acid (IV), decaoxotetraphosphoric acid (IV), hendecaoxotetraphosphoric acid (IV), and enneaoxotriphosphoric acid (V, IV, IV), etc., are also exemplified.

Orthophosphoric acids represented by the formula: $xH_2O \cdot yP_2O_5$ and satisfying $x/y=3$ are also exemplified. Polyphosphoric acids called "diphosphoric acid, triphosphoric acid, tetraphosphoric acid, pentaphosphoric acid, and the like" according to the degree of condensation and satisfying $2>x/y>1$, and mixtures thereof are also exemplified. Metaphosphoric acids satisfying $x/y=1$, especially trimetaphosphoric acid and tetrametaphosphoric acid are also exemplified. Ultraphosphoric acids having a network structure in which a part of the phosphorus pentoxide structure remains and satisfying $1>x/y>0$ (may be collectively referred to as "metaphosphoric acid-based compounds") are also exemplified. Acidic salts of these acids are also exemplified. Partial esters or whole esters of such an acid with a monohydric or polyhydric alcohol, or a polyalkylene glycol are also exemplified. Phosphono-substituted lower aliphatic carboxylic acid derivatives of these acids, and the like are also exemplified.

From the standpoint of catalyst deactivation ability, orthophosphoric acids represented by the formula: $xH_2O \cdot yP_2O_5$ and satisfying $x/y=3$ are preferred. Polyphosphoric acids called "diphosphoric acid, triphosphoric acid, tetraphosphoric acid, pentaphosphoric acid, and the like" according to the degree of condensation and satisfying $2>x/y>1$, and mixtures thereof are also preferred. Metaphosphoric acids satisfying $x/y=1$, especially trimetaphosphoric acid and tetrametaphosphoric acid are also preferred. Ultraphosphoric acids having a network structure in which a part of the phosphorus pentoxide structure remains and satisfying $1>x/y>0$ (may be collectively referred to as "metaphosphoric acid-based compounds") are also preferred. Acidic salts of these acids are also preferred. Partial esters of such an acid with a monohydric or polyhydric alcohol, or a polyalkylene glycol are also preferred.

The metaphosphoric acid-based compound which is used in the present invention includes cyclic metaphosphoric acids in which about 3 to 200 phosphoric acid units are condensed, ultra-region metaphosphoric acids having a three-dimensional network structure, and (alkali metal salts, alkaline earth metal salts, and onium salts) thereof. Above of all, cyclic sodium metaphosphate, ultra-region sodium metaphosphate, dihexylphosphonoethyl acetate (hereinafter sometimes abbreviated as DHPA) of a phosphono-substituted lower aliphatic carboxylic acid derivative, and the like are suitably used.

The polylactic acid is preferably one having a lactide content of 5,000 ppm or less. The lactide contained in the polylactic acid deteriorates the resin and worsens the color tone at the time of melting processing, and as the case may be, there is a concern that it makes unusable as a product. Although the poly(L-lactic acid) and/or poly(D-lactic acid) immediately after melt ring-opening polymerization generally contains 1 to 5% by weight of the lactide, the content of lactide can be reduced to a preferred range in any stage between the end of polymerization of poly(L-lactic acid) and/or poly(D-lactic acid) and molding of polylactic acid by carrying out conventionally known lactide reduction methods, namely, a vacuum devolatilization method with a single-screw or multi-screw extruder, or a high-vacuum treatment within a polymerizer, or the like alone or in combination.

The lower the lactide content, the more enhanced the melt stability and moist heat stability of the resin. However, since the lactide has such an advantage that it reduces the melt viscosity of the resin, it is rational and economical to set the lactide content to a value suitable for a desired purpose. That is, it is rational to set the lactide content to 1,000 ppm or less so as to achieve practical melt stability. The lactide content is selected within the range of more preferably 700 ppm or less, still more preferably 500 ppm or less, and especially preferably 100 ppm or less. When the polylactic acid component has the lactide content of the foregoing range, there are brought such advantages that the stability of the resin at the time of melt molding of a molded article of the present invention is enhanced; and that the molded article can be efficiently produced, and the moist heat stability and low gas properties of the molded article can be increased.

The stereocomplex polylactic acid can be obtained by bringing poly(L-lactic acid) and poly(D-lactic acid) into contact with each other in a weight ratio in the range of 10/90 to 90/10, preferably bringing them into melt contact with each other, and more preferably melt kneading them together. A contact temperature is in the range of preferably 220 to 290° C., more preferably 220 to 280° C., and still more preferably 225 to 275° C. from the viewpoints of enhancements of the stability at the time of melting of polylactic acid and the stereocomplex crystallization degree.

Although the melt kneading method is not particularly limited, a conventionally known batch type or continuous type melt mixer is preferably used. For example, a melt stirring tank, a single-screw or double-screw extruder, a kneader, an anaxial basket-type stirring tank, "VIBOLAC (registered trademark)", manufactured by Sumitomo Heavy Industries, Inc., N-SCR, manufactured by Mitsubishi Heavy Industries, Ltd., a spectacle blade, a lattice blade, or a Kenix type stirrer, manufactured by Hitachi, Ltd., or a tubular polymerizer equipped with a Sulzer SMLX type static mixer can be used. Above all, an anaxial basket type stirring tank that is a self-cleaning type polymerizer, N-SCR, a double-screw extruder, and the like are preferred from the viewpoint of productivity and quality, especially color tone of the polylactic acid.

<Hydrolysis Regulator (Component B)>

In the present invention, the hydrolysis regulator (component B) is an agent for sealing an end group of the resin (component A) and an acidic group generated by decomposition. That is, the hydrolysis regulator (component B) is an agent having an effect for inhibiting the autocatalysis of the resin (component A) to delay the hydrolysis.

As the acidic group, at least one member selected from the group consisting of a carboxyl group, a sulfonic acid group, a sulfinic acid group, a phosphonic acid group, and a phosphinic acid group is exemplified. In the present invention, a carboxyl group is especially exemplified.

Since the requirement for use is concerned with the use in hot water at a higher temperature than 135° C., it is preferred that the component B has water resistance at 120° C. of 95% or more and reactivity with an acidic group at 190° C. of 50% or more.

The water resistance at 120° C. as referred to herein is, for example, a value expressed by the following equation (ii) by using 1) a calculated value of an agent remaining without being changed after the 5-hour treatment, the value being calculated by means of analysis of a dissolved portion at the time after adding 2 g of water to a system having 1 g of the component B dissolved in 50 mL of dimethyl sulfoxide and stirring the resultant at 120° C. for 5 hours while refluxing, or 2) in the case where the component B is not soluble in dimethyl sulfoxide, a calculated value determined by performing the same treatment as that in the foregoing 1) using a solvent capable of dissolving the component B therein and having hydrophilicity. Incidentally, in 2), when a boiling point of the solvent to be used is lower than 120° C., the solvent was mixed with dimethyl sulfoxide in a range where at least a part of the component B is soluble therein, and 50 mL of the mixed solvent was used. Although a mixing proportion may be generally chosen within the range of 1/2 to 2/1, it is not particularly limited so long as the above-described requirement is satisfied.

In general, so long as the solvent which is used in 2) is selected from tetrahydrofuran, N,N-dimethylformamide, and ethyl acetate, the component B is soluble therein.

Water resistance(%)=[(Amount of the agent after the 5-hour treatment)/(Initial amount of the agent)]×100     (ii)

In the case of evaluating an instable agent for the water resistance, a part of the agent is denatured by the hydrolysis, and the sealing ability of the acidic group is lowered. In the case of using such an agent in high-temperature hot water, the agent is deactivated by the water, and the ability for sealing the target acidic group is remarkably lowered. In view of the foregoing, the water resistance at 120° C. is more preferably 97% or more, still more preferably 99% or more, and especially preferably 99.9% or more. That is, when the water resistance is 99.9% or more, namely the agent is stable in high-temperature hot water, the reaction with the acidic group can be performed selectively and efficiently.

The reactivity with an acidic group at 190° C. as referred to herein is, for example, a value obtained by measuring a carboxyl group concentration regarding a resin composition obtained by adding the agent in an amount such that the group of the hydrolysis regulator, reacting with the carboxyl group, is corresponding to 1.5 equivalents to the carboxyl group concentration of the polylactic acid for evaluation to 100 parts by weight of the polylactic acid for evaluation, followed by melt kneading under a nitrogen atmosphere at a resin temperature of 190° C. and at a rotation rate of 30 rpm for 1 minute by using a Labo Plasto mill (manufactured by Toyo Seiki Seisaku-Sho, Ltd.), the value being given according to the following equation (iii).

Reactivity(%)=[{(Carboxyl group concentration of polylactic acid for evaluation)−(Carboxyl group concentration of resin composition)}/(Carboxyl group concentration of polylactic acid for evaluation)]×100     (iii)

The polylactic acid for evaluation is preferably one having an MW of 120,000 to 200,000 and a carboxyl group concentration of 10 to 30 equivalents/ton. As such a polylactic acid, for example, polylactic acid "NW3001D", manufactured by NatureWorks LLC (MW: 150,000, carboxyl group concentration: 22.1 equivalents/ton) and the like can be suitably used. In that case, a value of the reactivity can be determined by measuring a carboxyl group concentration regarding a resin composition obtained by adding the agent in an amount such that the group of the hydrolysis regulator, reacting with the carboxyl group, is 33.15 equivalents/ton, followed by melt kneading under a nitrogen atmosphere at a resin temperature of 190° C. and at a rotation rate of 30 rpm for 1 minute by using a Labo Plasto mill (manufactured by Toyo Seiki Seisaku-Sho, Ltd.).

Besides, the reactivity with an acidic group may also be given by the equivalent evaluation.

In the case of evaluating a stable agent for the reactivity, even when kneading is performed under the above-described condition, the carboxyl group concentration of the resin composition does not substantially change. In the case of using such an agent in high-temperature hot water, the ability for sealing the target acidic group is not substantially exhibited, and therefore, the decomposition of the resin (component A) cannot be inhibited.

In view of the foregoing, the reactivity with an acidic group at 190° C. is more preferably 60% or more, still more preferably 70% or more, and especially preferably 80% or more. That is, when the reactivity is 80% or more, namely the reactivity with an acidic group in high-temperature hot water is high, the reaction with the acidic group can be efficiently performed.

It is important that the hydrolysis regulator (component B) of the present invention has water resistance at 120° C. of 95% or more and reactivity with an acidic group at 190° C. of 50% or more. That is, in a very stable agent, though the water resistance is a high value, the reactivity with an acidic group is a low value, and in that case, the ability for sealing the target acidic group in high-temperature hot water is not substantially exhibited. In a very instable agent, though the reactivity with an acidic group is a high value, the water resistance is a low value, and in that case, the agent is deactivated with water in high-temperature hot water, and therefore, the ability for sealing the target acidic group is remarkably lowered.

In view of the foregoing, the hydrolysis regulator having high water resistance and reactivity with an acidic group is suitably used in the present invention.

Examples of the component B include addition reaction type compounds, such as carbodiimide compounds, isocyanate compounds, epoxy compounds, oxazoline compounds, oxazine compounds, aziridine compounds, etc.

These compounds can be used in combination of two or more thereof. From the viewpoints of water resistance and reactivity with an acidic group, carbodiimide compounds are preferably exemplified.

As the carbodiimide compound, a compound having a basic structure represented by the following general formula (I) or (II) can be exemplified.

R—N=C=N—R'     (I)

(In the formula, each of R and R' is independently an aliphatic group having 1 to 20 carbon atoms, an alicyclic group having 3 to 20 carbon atoms, an aromatic group having 5 to 15 carbon atoms, or a combination thereof, and may contain a hetero atom; and R and R' may be bonded to each other to form a cyclic structure, and may form two or more cyclic structures through a spiro structure or the like.)

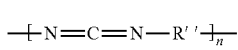 (II)

(In the formula, each of R and R″ is independently an aliphatic group having 1 to 20 carbon atoms, an alicyclic group having 3 to 20 carbon atoms, an aromatic group having 5 to 15 carbon atoms, or a combination thereof, and may contain a hetero atom; and n is an integer of 2 to 1,000.)

From the viewpoint of stability or easiness of handling, aromatic carbodiimide compounds are more preferred. Examples thereof include aromatic carbodiimide compounds represented by the following formulae (2) and (3).

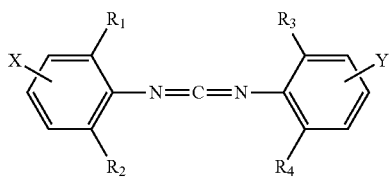 (2)

(In the formula, each of $R_1$ to $R_4$ is independently an aliphatic group having 1 to 20 carbon atoms, an alicyclic group having 3 to 20 carbon atoms, an aromatic group having 5 to 15 carbon atoms, or a combination thereof, and may contain a hetero atom; each of X and Y is independently a hydrogen atom, an aliphatic group having 1 to 20 carbon atoms, an alicyclic group having 3 to 20 carbon atoms, an aromatic group having 5 to 15 carbon atoms, or a combination thereof, and may contain a hetero atom; and the respective aromatic rings may be bonded to each other via a substituent to form a cyclic structure, and may form two or more cyclic structures through a spiro structure or the like.)

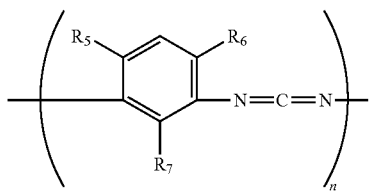 (3)

(In the formula, each of $R_5$ to $R_7$ is independently an aliphatic group having 1 to 20 carbon atoms, an alicyclic group having 3 to 20 carbon atoms, an aromatic group having 5 to 15 carbon atoms, or a combination thereof, and may contain a hetero atom; and n is an integer of 2 to 1,000.)

Specific examples of such an aromatic carbodiimide compound include polycarbodiimides synthesized by subjecting bis(2,6-diisopropylphenyl)carbodiimide or 1,3,5-triisopropylbenzene-2,4-diisocyanate to a decarboxylation condensation reaction, a combination of these two kinds, and the like.

In the present invention, from the viewpoint of using in high-temperature hot water, bis(2,6-diisopropylphenyl)carbodiimide can be suitably used.

As for bis(2,6-diisopropylphenyl)carbodiimide, from the viewpoints of water resistance and reactivity, its purity is desirably high as far as possible, and it is preferably 95% or more, more preferably 97% or more, and still more preferably 99% or more (here, the purity is determined from an area obtained by the measurement by means of HPLC as described in the working examples as described later).

As for bis(2,6-diisopropylphenyl)carbodiimide, from the viewpoints of water resistance and reactivity, a total sum content of compounds represented by the following formulae (4) and (5) is preferably 5% or less, more preferably 3% or less, and still more preferably 1% or less (here, the total sum content of the compounds represented by the following formulae (4) and (5) is determined by the measurement by means of $^1$H-NMR as described in the working examples as described later).

In the case where the total sum content of the compounds represented by the following formulae (4) and (5) is 5% or less, the effect in high-temperature hot water is more enhanced. Although this enhancement of the effect cannot be confirmed in warm water at about 80° C., it can be confirmed that a meaningful difference in hot water at a high temperature of at least 180° C. or higher is exhibited, and from the viewpoint of water resistance of the compounds represented by the following formulae (4) and (5), it may be conjectured that a meaningful difference is exhibited in a high-temperature region of 135° C. or higher.

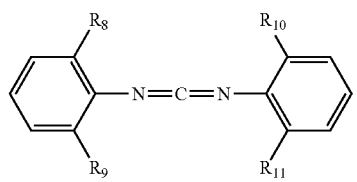 (4)

(In the formula, each of $R_8$ to $R_{11}$ is an aliphatic group having 3 carbon atoms, and at least one of them is a propyl group, with the other group or groups being an isopropyl group.)

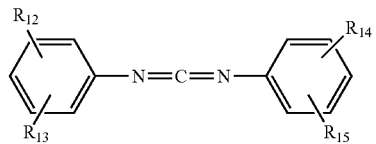 (5)

(In the formula, each of $R_{12}$ to $R_{15}$ is an aliphatic group having 3 carbon atoms, and at least one group of them is substituted on a position other than the ortho position.)

As a method of obtaining bis(2,6-diisopropylphenyl)carbodiimide having a high purity, a generally known purification method can be adopted. As a specific method thereof, distillation, recrystallization, washing, extraction, reprecipitation, column chromatography, and the like are exemplified.

In particular, in the case of purifying only bis(2,6-diisopropylphenyl)carbodiimide from a mixture of bis(2,6-diisopropylphenyl)carbodiimide and the compound represented by the foregoing formula (4) or (5), since the both compounds have the same molecular weight and resemble each other in terms of an affinity with a solvent, purification by means of recrystallization is preferred.

As for the solvent which is used for the recrystallization, any solvent is usable so long as it does not react with bis(2,6-diisopropylphenyl)carbodiimide, and for example, alcohols, such as methanol, ethanol, etc., and alkanes, such as hexane, etc., can be used. A combination of two or more kinds of solvents may be used.

<Resin Composition>

The resin composition of the present invention satisfies any one of the following A1 to A3:

A1: In hot water at an arbitrary temperature of 135° C. to 160° C., after 3 hours, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less;

A2: In hot water at an arbitrary temperature of 160° C. to 180° C., after 2 hour, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less; and A3: In hot water at an arbitrary temperature of 180° C. to 220° C., after 1 hour, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less.

In order that the resin composition of the present invention may exhibit the desired performance, it is important to control the resin composition so as to be quickly decomposed after keeping the weight and shape of the resin in hot water at a higher temperature than 135° C. for a fixed period of time. Although the fixed period of time is determined according to an application, it is preferably any of 10 minutes to 12 hours. From the viewpoint of exhibiting the desired performance, the fixed period of time is more preferably any of 30 minutes to 6 hours, and still more preferably any of 30 minutes to 4 hours.

As for the matter of keeping the weight and shape of the resin, it is preferred that the weight of the water-insoluble matter of the resin composition is 50% or more; and that the amount of volume change expressing the shape is 50% or less. For example, even when the weight of the water-insoluble matter of the resin composition is 50% or more, if it is in the completely hydrolyzed state, it may not be said that the weight and shape of the resin are kept. From the viewpoint of exhibiting the desired performance, the weight of the water-insoluble matter of the resin composition is more preferably 70% or more, and still more preferably 90% or more. The amount of volume change expressing the shape is more preferably 30% or less, and still more preferably 10% or less.

Here, the weight and the amount of volume change of the shape of the resin are, for example, values given by the following evaluations.

A closed melting crucible (manufactured by OM Lab-Tech Co., Ltd., MR-28, capacity: 28 mL) preheated at 110° C. is charged with 300 mg of the resin composition and 12 mL of distilled water and hermetically sealed, and the crucible is allowed to stand within a hot air dryer (manufactured by Koyo Thermo Systems Co., Ltd., KLO-45M,) previously kept at a prescribed temperature.

After allowing the crucible to stand, a time at which the temperature in the interior of the crucible reaches a prescribed test temperature after the crucible is allowed to stand in the hot air dryer is defined as a point of time of starting the test, at a point of time when a certain period of time elapses from this point of time of starting the test, the crucible is taken out from the hot air dryer. The crucible taken out from the hot air dryer is air-cooled for 20 minutes and then cooled for 10 minutes by means of water cooling to ordinary temperature, and thereafter, the crucible is opened to recover the sample and water in the interior of the crucible.

The sample and water in the interior of the crucible are subjected to filtration using a filter paper (in conformity with JIS P3801:1995, class 5A); the resin composition remaining on the filter paper is dried at 60° C. under a vacuum of 133.3 Pa or less for 3 hours; thereafter, the weight of the resin composition and the volume of the shape are measured; and the weight and the amount of volume change of the shape of the resin are determined according to the following equations (iv) and (v).

$$\text{Weight}(\%) = [(\text{Weight of resin composition after treatment for a fixed period of time})/(\text{Weight of resin composition at the initial stage})] \times 100 \quad \text{(iv)}$$

$$\text{Amount of volume change of shape}(\%) = [(\text{Volume of resin composition after treatment for a fixed period of time})/(\text{Volume of resin composition at the initial stage})] \times 100 \quad \text{(v)}$$

Here, the volume of the shape is a value determined by measuring the resin composition by a stereoscopic microscope.

As the stereomicroscope, M205C, manufactured by Leica Microsystems, and the like can be used.

Incidentally, in this evaluation, with respect to the size of the resin composition, for example, so far as a pellet-like material is concerned, those close to a cube or rectangular parallelepiped of 0.5 mm to 5 mm in each side; so far as a fibrous material is concerned, fibers having a yarn thickness of 1 μm to 1,000 μm and a yarn length of 1 mm to 40 mm; and so far as a filmy material is concerned, films having a thickness of 50 μm to 1,000 μm and a length of each of the length and the width of 5 mm to 50 mm, can be generally used.

Besides, the weight and the amount of volume change of the shape of the resin may also be given by the equivalent evaluation. The matter that the resin is quickly decomposed means the state in which the hydrolysis of the component A is promoted by the autocatalysis, and the concentration of the acidic group exponentially increases. Conversely, during the period when the concentration of the acidic group is kept low by the component B, the decomposition of the component A becomes gentle. For that reason, during the period when the weight and shape of the resin are kept, it is preferred that the concentration of the acidic group derived from the resin composition is 30 equivalents/ton or less.

In the case where the concentration of the acidic group is more than 30 equivalents/ton, the hydrolysis of the component A is promoted due to the autocatalysis, and the effect of the component B is not sufficiently exhibited. When the concentration of the acidic group is lower, the change of the weight of the resin composition or the shape can be inhibited. Therefore, from the viewpoint that the desired performance is exhibited, during the period when the weight and shape of the resin are kept, the concentration of the acidic group derived from the resin composition is more preferably 20 equivalents/ton or less, still more preferably 10 equivalents/ton or less, and especially preferably 3 equivalents/ton or less.

Here, the concentration of the acidic group derived from the resin composition can be, for example, determined by preparing a resin composition in the same manner as that used in the above-described evaluation for determining the weight and the amount of volume change of the shape of the resin and measuring the resulting resin composition by means of $^1$H-NMR.

The resin composition of the present invention can be suitably used in hot water at an arbitrary temperature of 135° C. to 220° C. When the temperature is 135° C. or lower, there may be the case where the desired performance can be exhibited by using only the component A. In addition, when even the temperature is higher than 220° C., there may be the case where even the resin composition of the present invention is immediately decomposed, so that the desired performance cannot be exhibited. For that reason, the resin composition of the present invention can be more suitably used in hot water at an arbitrary temperature of 150° C. to 220° C., can be still more suitably used in hot water at an arbitrary temperature of 170° C. to 210° C., and can be yet still more suitably used in hot water at an arbitrary temperature of 190° C. to 210° C.

The resin composition of the present invention satisfies any one of the following A1 to A3:

A1: In hot water at an arbitrary temperature of 135° C. to 160° C., after 3 hours, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less;

A2: In hot water at an arbitrary temperature of 160° C. to 180° C., after 2 hour, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less; and A3: In hot water at an arbitrary temperature of 180° C. to 220° C., after 1 hour, not only a resin composition-derived acidic group concentration is 30 equivalents/ton or less, but also a weight of a water-insoluble matter of the resin composition is 50% or more, and after 24 hours, a weight of a water-insoluble matter of the resin composition is 50% or less.

The range where the resin composition of the present invention can be suitably used varies with the temperature. In A1 to A3, at a time earlier than after the prescribed fixed period of time (1 hour, 2 hours, or 3 hours), it is preferred that the resin composition-derived acidic group concentration is 30 equivalents/ton or less, and the weight of the water-insoluble matter of the resin composition is 50% or more.

In A1, it is expressed that the fixed period of time is 3 hours and during that time, the weight and shape of the resin are kept. From the viewpoint of exhibiting the desired performance in the excavation technology in the oil field or the like, in hot water at an arbitrary temperature of 135° C. to 160° C., after a fixed period of time longer than 2 hours as defined in the present invention, the resin composition-derived acidic group concentration may be 30 equivalents/ton or less, and the weight of the water-insoluble matter of the resin composition may be 50% or more.

In A2, it is expressed that the fixed period of time is 2 hours and during that time, the weight and shape of the resin are kept. From the viewpoint of exhibiting the desired performance in the excavation technology in the oil field or the like, in hot water at an arbitrary temperature of 160° C. to 180° C., after a fixed period of time longer than 2 hours as defined in the present invention, the resin composition-derived acidic group concentration may be 30 equivalents/ton or less, and the weight of the water-insoluble matter of the resin composition may be 50% or more.

In A3, it is expressed that the fixed period of time is 1 hour and during that time, the weight and shape of the resin are kept. From the viewpoint of exhibiting the desired performance in the excavation technology in the oil field or the like, in hot water at an arbitrary temperature of 180° C. to 220° C., after a fixed period of time longer than 1 hour as defined in the present invention, the resin composition-derived acidic group concentration may be 30 equivalents/ton or less, and the weight of the water-insoluble matter of the resin composition may be 50% or more.

After the fixed period of time prescribed in each of A1 to A3 (1 hour, 2 hours, or 3 hours), the effect for sealing the acidic group by the component B vanishes, the decomposition of the resin is promoted due to the autocatalysis of the acidic group, and following that, the concentration of the acidic group exponentially increases. Furthermore, as the decomposition proceeds, the resin becomes a water-soluble monomer, whereby it becomes soluble in water. The matter that the instant phenomenon occurs quickly as far as possible after the weight and shape of the resin are kept for a fixed period of time is suitable on the occasion of using the resin composition of the present invention in the excavation technology in the oil field or the like. For that reason, it is preferred that after 24 hours, the weight of the water-insoluble matter of the resin composition is 50% or less. For the foregoing reason, it is more preferred that after 18 hours, the weight of the water-insoluble matter of the resin composition is 50% or less; it is still more preferred that after 12 hours, the weight of the water-insoluble matter of the resin composition is 50% or less; and it is yet still more preferred that after 6 hours, the weight of the water-insoluble matter of the resin composition is 50% or less.

As for the resin composition of the present invention, it is preferred that in hot water at an arbitrary temperature of 135° C. to 220° C., after 100 hours, the weight of the water-insoluble matter of the resin composition is 10% or less. For example, on the occasion of using the resin composition in the excavation technology in the oil field or the like, the resin composition is dissolved in water quickly after keeping the weight and shape of the resin for a fixed period of time, whereby it can effectively work. For that reason, it is preferred that in hot water at an arbitrary temperature of 135° C. to 220° C., after 100 hours, the weight of the water-insoluble matter of the resin composition is 10% or less. From the viewpoints of treatment in water after the use and exhibition of the desired performance, the water-insoluble matter is low as far as possible, and after 100 hours, the weight of the water-insoluble matter of the resin composition is more preferably 5% or less, and still more preferably 1% or less.

It is preferred that a heat deformation temperature of the resin composition of the present invention is 135° C. to 300° C. Here, the heat deformation temperature refers to a melting point or softening point of the resin composition. Since the resin composition is supposed to be used in hot water at a higher temperature than 135° C., when the heat deformation temperature of the resin composition is higher, the resin composition can be used in a wide temperature region. Meanwhile, when the heat deformation temperature is 300° C. or less, molding of the resin composition of the present invention is relatively easy. For that reason, the heat deformation temperature of such a resin composition is more preferably 150° C. to 300° C., still more preferably 165° C. to 300° C., yet still more preferably 170° C. to 300° C., even yet still more preferably 175° C. to 285° C., and especially preferably 180° C. to 285° C.

In the resin composition of the present invention, an addition amount of the component B is 1 to 30 parts by weight based on 100 parts by weight of a total sum of the component A and the component B. When the addition amount of the component B is less than 1 part by weight, there may be the case where the sufficient effect for sealing the acidic group is not exhibited in hot water at a higher temperature than 135° C. When it is more than 30 parts by weight, there may be the case where bleedout of the component B from the resin composition, worsening of moldability, or degeneration of properties of a substrate takes place. From such viewpoints, the addition amount of the component B is preferably 1.5 to 20 parts by weight, more preferably 2 to 15 parts by weight, still more preferably 2.5 to 12.5 parts by weight, and especially preferably 3.0 to 10 parts by weight based on 100 parts by weight of a total sum of the component A and the component B.

<Production Method of Resin Composition>

The resin composition of the present invention can be produced by melt kneading the resin containing, as a main component, a water-soluble monomer and having autocatalysis (component A) and the hydrolysis regulator (component B).

Incidentally, in the case of adopting polylactic acid as the resin containing, as a main component, a water-soluble monomer and having autocatalysis (component A), poly(L-lactic acid) and poly(D-lactic acid), each of which is the resin containing, as a main component, a water-soluble monomer and having autocatalysis (component A), and the hydrolysis regulator (component B) are mixed to form a stereocomplex polylactic acid, and simultaneously, the resin composition of the present invention can also be produced. The resin composition of the present invention can also be produced by mixing poly(L-lactic acid) and poly(D-lactic acid) to form stereocomplex polylactic acid and then mixing the hydrolysis regulator (component B).

The method of adding the hydrolysis regulator (component B) to the resin containing, as a main component, a water-soluble monomer and having autocatalysis (component A) and mixing them is not particularly limited, and a conventionally known method, such as a method of adding as a solution, a melt, or a master batch of the resin containing, as a main component, a water-soluble monomer and having autocatalysis (component A) to be applied; a method of bringing a solid of the resin containing, as a main component, a water-soluble monomer and having autocatalysis (component A) into contact with a liquid having the hydrolysis regulator (component B) dissolved, dispersed or melted therein, thereby penetrating the hydrolysis regulator (component B) thereinto; and the like can be adopted.

In the case of adopting a method of adding as a solution, a melt, or a master batch of the resin containing, as a main component, a water-soluble monomer and having autocatalysis (component A) to be applied, a method of addition using a conventionally known kneading device can be adopted. On the occasion of kneading, a kneading method in a solution state or a kneading method in a molten state is more preferred from the viewpoint of uniform kneading properties. The kneading device is not particularly limited, and conventionally known vertical reaction vessels, mixing tanks, and kneading tanks, or single-screw or multi-screw horizontal kneading devices, for example, single-screw or multi-screw extruders and kneader, and the like are exemplified. A mixing time is not particularly specified, and though it varies with the mixing device or mixing temperature, a time of 0.1 minutes to 2 hours, preferably 0.2 minutes to 60 minutes, and more preferably 0.2 minutes to 30 minutes is selected.

As the solvent, those which are inert to the resin containing, as a main component, a water-soluble monomer and having autocatalysis (component A) and the hydrolysis regulator (component B) can be used. In particular, a solvent which has an affinity with the both components and at least partially dissolves the both components therein is preferred.

As the solvent, for example, hydrocarbon-based solvents, ketone-based solvents, ester-based solvents, ether-based solvents, halogen-based solvents, amide-based solvents, and the like can be used.

Examples of the hydrocarbon-based solvent include hexane, cyclohexane, benzene, toluene, xylene, heptane, decane, and the like. Examples of the ketone-based solvent include acetone, methyl ethyl ketone, diethyl ketone, cyclohexanone, isophorone, and the like.

Examples of the ester-based solvent include ethyl acetate, methyl acetate, ethyl succinate, methyl carbonate, ethyl benzoate, diethylene glycol diacetate, and the like. Examples of the ether-based solvent include diethyl ether, dibutyl ether, tetrahydrofuran, dioxane, diethylene glycol dimethyl ether, triethylene glycol diethyl ether, diphenyl ether, and the like. Examples of the halogen-based solvent include dichloromethane, chloroform, tetrachloromethane, dichloroethane, 1,1',2,2'-tetrachloroethane, chlorobenzene, dichlorobenzene, and the like. Examples of the amide-based solvent include formamide, N,N-dimethylformamide, N,N-dimethylacetamide, N-methyl-2-pyrrolidone, and the like. These solvents can be used alone or as a mixed solvent, if desired.

In the present invention, the solvent is applied in an amount in the range of 1 to 1,000 parts by weight based on 100 parts by weight of the resin composition. When the amount of the solvent is less than 1 part by weight, there is no meaning for the application of the solvent. Although an upper limit value of the use amount of the solvent is not particularly limited, it is about 1,000 parts by weight from the viewpoints of operability and reaction efficiency.

In the case of adopting a method of bringing a solid of the resin containing, as a main component, a water-soluble monomer and having autocatalysis (component A) into contact with a liquid having the hydrolysis regulator (component B) dissolved, dispersed or melted therein, thereby penetrating the hydrolysis regulator (component B), a method of bringing a solid of the resin containing, as a main component, a water-soluble monomer and having autocatalysis (component A) into contact with the hydrolysis regulator (component B) dissolved in a solvent as described above; a method of bringing a solid of the resin containing, as a main component, a water-soluble monomer and having autocatalysis (component A) into contact with an emulsion liquid of the hydrolysis regulator (component B); and the like can be adopted.

As the contacting method, a method of dipping the resin containing, as a main component, a water-soluble monomer and having autocatalysis (component A); a method of coating the resin containing, as a main component, a water-soluble monomer and having autocatalysis (component A);

a method of spraying onto the resin containing, as a main component, a water-soluble monomer and having autocatalysis (component A); and the like can be suitably adopted.

Although it is possible to perform a sealing reaction of the acidic group of the resin containing, as a main component, a water-soluble monomer and having autocatalysis (component A) with the hydrolysis regulator (component B) at a temperature of room temperature (25° C.) to about 300° C., the sealing reaction is more promoted at a temperature in the range of preferably 50 to 280° C., and more preferably 100 to 280° C. from the viewpoint of reaction efficiency. As for the resin containing, as a main component, a water-soluble monomer and having autocatalysis (component A), the reaction is liable to be more advanced at a temperature at which it is melted; however, in order to inhibit volatilization, decomposition, or the like of the hydrolysis regulator (component B), it is preferred to perform the reaction at a temperature lower than 300° C. For the purposes of lowering the melting temperature of the resin containing, as a main component, a water-soluble monomer and having autocatalysis (component A) and increasing the stirring efficiency, it is effective to apply a solvent.

Although the reaction is sufficiently rapidly advanced in the absence of a catalyst, a catalyst for promoting the reaction can also be used. As the catalyst, catalysts which are generally used for the hydrolysis regulator (component B) can be applied. These can be used alone or in combination of two or more kinds thereof. Although an addition amount of the catalyst is not particularly limited, it is preferably 0.001 to 1 part by weight, more preferably 0.01 to 0.1 parts by weight, and most preferably 0.02 to 0.1 parts by weight based on 100 parts by weight of the resin composition.

In the present invention, the hydrolysis regulator (component B) may be used in a combination of two or more kinds thereof. For example, with respect to the hydrolysis regulator (component B) for performing the sealing reaction of the acidic group at the early stage of the resin containing, as a main component, a water-soluble monomer and having autocatalysis (component A) and the hydrolysis regulator (component B) for performing the sealing reaction of the acidic group generated in hot water at a higher temperature than 135° C., separate materials may be used.

Furthermore, it is preferred to jointly use an auxiliary agent of the hydrolysis regulator (component B), namely an agent for assisting the effect of the component B for the purpose of delaying the hydrolysis. Although any known material can be used as such an agent, for example, at least one compound selected from hydrotalcite, an alkaline earth metal oxide, an alkaline earth metal hydroxide, and an alkaline earth metal carbonate is exemplified. A content of the auxiliary agent is preferably 0.1 to 30 parts by weight, more preferably 0.5 to 20 parts by weight, and still more preferably 0.7 to 10 parts by weight based on 100 parts by weight of the hydrolysis regulator (component B).

In the resin composition of the present invention, all of known additives and fillers can be added and used within the range where the effects of the invention are not lost. Examples thereof include a stabilizer, a crystallization promoter, a filler, a release agent, an antistatic agent, a plasticizer, an impact resistance-improving agent, a terminal-sealing agent, and the like.

Incidentally, from the viewpoint that the effects of the invention are not lost, with respect to the additives, it is important to not use a component which promotes the decomposition of the resin containing, as a main component, a water-soluble monomer and having autocatalysis (component A), for example, a phosphoric acid component, a phosphite-based additive which is decomposed in the resin composition to generate a phosphoric acid component, or the like, or decrease its amount as far as possible, or to reduce influences thereof by taking a method, such as deactivation, etc. For example, a method of using a component capable of achieving deactivation or retardation together with the hydrolysis regulator (component B), or the like can be suitably adopted.

<Stabilizer>

The resin composition of the present invention can contain a stabilizer. As the stabilizer, those which are used for a stabilizer of ordinary thermoplastic resins can be used. For example, an antioxidant, a light stabilizer, and the like can be exemplified. By compounding such an agent, a molded article having excellent mechanical properties, moldability, heat resistance, and durability can be obtained.

As the antioxidant, a hindered phenol-based compound, a hindered amine-based compound, a phosphite-based compound, a thioether-based compound, and the like can be exemplified.

Examples of the hindered phenol-based compound include n-octadecyl-3-(3',5'-di-tert-butyl-4'-hydroxyphenyl)-propionate, n-octadecyl-3-(3'-methyl-5'-tert-butyl-4'-hydroxyphenyl)-propionate, n-tetradecyl-3-(3',5'-di-tert-butyl-4'-hydroxyphenyl)-propionate, 1,6-hexanediol-bis[3-(3,5-di-tert-butyl-4-hydroxyphenyl)-propionate], 1,4-butanediol-bis[3-(3,5-di-tert-butyl-4-hydroxyphenyl)-propionate], 2,2'-methylene-bis(4-methyl-tert-butylphenol), triethylene glycol-bis([3-(3-t-butyl-5-methyl-4-hydroxyphenyl)-propionate], tetrakis[methylene-3-(3',5'-di-tert-butyl-4-hydroxyphenyl)propionate]methane, 3,9-bis[2-{3-(3-tert-butyl-4-hydroxy-5-methylphenyl)propionyloxy}-1,1-dimethylethyl]2,4,8,10-tetraoxaspiro(5,5)undecane, and the like.

Examples of the hindered amine-based compound include N,N'-bis-3-(3',5'-di-tert-butyl-4'-hydroxyphenyl)propionyl hexamethylenediamine, N,N'-tetramethylene-bis[3-(3'-methyl-5'-tert-butyl-4'-hydroxyphenyl)propionyl]diamine, N,N'-bis[3-(3,5-di-tert-butyl-4-hydroxyphenyl)-propionyl] hydrazine, N-salicyloyl-N'-salicylidenehydrazine, 3-(N-salicyloyl)amino-1,2,4-triazole, N,N'-bis[2-{3-(3,5-di-tert-butyl-4-hydroxyphenyl)propionyloxy}ethyl]oxyamide, and the like. Triethylene glycol-bis[3-(3-tert-butyl-5-methyl-4-hydroxyphenyl)-propionate], tetrakis[methylene-3-(3',5'-di-tert-butyl-4-hydroxyphenyl) propionate]methane, and the like are preferred.

The phosphite-based compound is preferably a compound having at least one P—O bond bonded to an aromatic group. Specifically, examples thereof include tris(2,6-di-tert-butylphenyl)phosphite, tetrakis(2,6-di-tert-butylphenyl)4,4'-biphenylene phosphite, bis(2,6-di-tert-butyl-4-methylphenyl) pentaerythritol-di-phosphite, 2,2-methylenebis(4,6-di-tert-butylphenyl)octylphosphite, 4,4'-butylidene-bis(3-methyl-6-tert-butylphenyl-di-tridecyl)phosphite, 1,1,3-tris(2-methyl-4-ditridecylphosphite-5-tert-butylphenyl)butane, tris (mixed mono- and di-nonylphenyl)phosphite, tris (nonylphenyl)phosphite, 4,4'-isopropylidenebis(phenyl-dialkylphosphite), 2,4,8,10-tetra-tert-butyl-6-[3-(3-methyl-4-hydroxy-5-t-butylphenyl)propoxy]dibenzo[d,f][1,3,2] dioxaphosphepin (SUMILIZER (registered trademark) GP), and the like.

Specific examples of the thioether-based compound include dilauryl thiodipropionate, ditridecyl thiodipropionate, dimyristyl thiodipropionate, distearyl thiodipropionate, pentaerythritol-tetrakis(3-laurylthiopropionate), pentaerythritol-tetrakis(3-dodecylthiopropionate), pentaerythritol-tetrakis(3-octadecylthiopropionate), pentaerythritol-tetrakis(3-myristylthiopropionate), pentaerythritol-tetrakis(3-stearylthiopropionate), and the like.

As the light stabilizer, specifically, for example, a benzophenone-based compound, a benzotriazole-based compound, an aromatic benzoate-based compound, an oxalic anilide-based compound, a cyanoacrylate-based compound, a hindered amine-based compound, and the like can be exemplified.

Examples of the benzophenone-based compound include benzophenone, 2,4-dihydroxybenzophenone, 2,2'-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-octoxybenzophenone, 2-hydroxy-4-dodecyloxybenzophenone, 2-hydroxy-4-octoxybenzophenone, 2-hydroxy-4-methoxy-5-sulfobenzophenone, 5-chloro-2-hydroxybenzophenone, 2-hydroxy-4-octoxybenzophenone, 2-hydroxy-4-methoxy-2'-carboxybenzophenone, 2-hydroxy-4-(2-hydroxy-3-methylacryloxyisopropoxy)benzophenone, and the like.

Examples of the benzotriazole-based compound include 2-(5-methyl-2-hydroxyphenyl)benzotriazole, 2-(3,5-di-tert-butyl-2-hydroxyphenyl)benzotriazole, 2-(3,5-di-tert-amyl-2-hydroxyphenyl)benzotriazole, 2-(3',5'-di-tert-butyl-4'-methyl-2'-hydroxyphenyl)benzotriazole, 2-(3,5-di-tert-amyl-2-hydroxyphenyl)-5-chlorobenzotriazole, 2-(5-tert-butyl-2-hydroxyphenyl)benzotriazole, 2-[2'-hydroxy-3',5'-bis(α,α-dimethylbenzyl)phenyl]benzotriazole, 2-[2'-hydroxy-3',5'-bis(α,α-dimethylbenzyl)phenyl]-2H-benzotriazole, 2-(4'-octoxy-2'-hydroxyphenyl) benzotriazole, and the like.

Examples of the aromatic benzoate-based compound include alkylphenyl salicylates, such as p-tert-butylphenyl salicylate, p-octylphenyl salicylate, etc.

Examples of the oxalic anilide-based compound include 2-ethoxy-2'-ethyloxalic acid bisanilide, 2-ethoxy-5-tert-butyl-2'-ethyloxalic acid bisanilide, 2-ethoxy-3'-dodecyloxalic acid bisanilide, and the like.

Examples of the cyanoacrylate-based compound include ethyl-2-cyano-3,3'-diphenyl acrylate, 2-ethylhexyl-cyano-3,3'-diphenyl acrylate, and the like.

Examples of the hindered amine-based compound include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-octadecyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)carbonate, bis(2,2,6,6-tetramethyl-4-piperidyl)oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyl)-tolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-tert-butyl-4-hydroxyphenyl)propionyloxy}-2,2,6,6-tetramethylpiperidine, a condensate of 1,2,3,4-butane tetracarboxylic acid, 1,2,2,6,6-pentamethyl-4-piperidinol, and β,β,β',β'-tetramethyl-3,9-[2,4,8,10-tetraoxaspiro(5,5)undecane]dimethanol, and the like.

In the present invention, the stabilizer component may be used alone, or may be used in combination of two or more kinds thereof. As the stabilizer component, a hindered phenol-based compound and/or a benzotriazole-based compound is preferred.

A content of the stabilizer is preferably 0.01 to 3 parts by weight, and more preferably 0.03 to 2 parts by weight based on 100 parts by weight of the resin containing, as a main component, a water-soluble monomer and having autocatalysis (component A).

<Crystallization Accelerator>

The resin composition of the present invention can contain an organic or inorganic crystallization accelerator. When the resin composition contains the crystallization accelerator, a molded article having excellent mechanical properties, heat resistance, and moldability can be obtained.

That is, by applying the crystallization accelerator, a molded article which is enhanced in moldability and crystallinity, is thoroughly crystallized even by ordinary injection molding, and is excellent in heat resistance and moist heat stability can be obtained. In addition thereto, the time required for the manufacture of a molded article can be drastically shortened, and its economic effect is large.

A crystal nucleating agent which is generally used for crystalline resins can be used as the crystallization accelerator which is used in the present invention. All of an inorganic crystal nucleating agent and an organic crystal nucleating agent can be used.

Examples of the inorganic crystal nucleating agent include talc, kaolin, silica, synthetic mica, clay, zeolite, graphite, carbon black, zinc oxide, magnesium oxide, titanium oxide, calcium carbonate, calcium sulfate, barium sulfate, calcium sulfide, boron nitride, montmorillonite, neodymium oxide, aluminum oxide, phenylphosphonate metal salts, and the like. Such an inorganic crystal nucleating agent is preferably treated with a dispersion aid of every sort in order to increase its dispersibility in the composition and its effects and highly dispersed to such an extent that its primary particle diameter is about 0.01 to 0.5 μm.

Examples of the organic crystal nucleating agent include organic carboxylic acid metal salts, such as calcium benzoate, sodium benzoate, lithium benzoate, potassium benzoate, magnesium benzoate, barium benzoate, calcium oxalate, disodium terephthalate, dilithium terephthalate, dipotassium terephthalate, sodium laurate, potassium laurate, sodium myristate, potassium myristate, calcium myristate, barium myristate, sodium octacosanoate, calcium octacosanoate, sodium stearate, potassium stearate, lithium stearate, calcium stearate, magnesium stearate, barium stearate, sodium montanate, calcium montanate, sodium toluoylate, sodium salicylate, potassium salicylate, zinc salicylate, aluminum dibenzoate, sodium β-naphthoate, potassium β-naphthoate, sodium cyclohexanecarboxylate, etc.; and organic sulfonic acid metal salts, such as sodium p-toluenesulfonate, sodium sulfoisophthalate, etc.

Organic carboxylic acid amides, such as stearic acid amide, ethylenebis(lauric amide), palmitic acid amide, hydroxystearic acid amide, erucic acid amide, tris(t-butylamide)trimesate, etc., low-density polyethylene, high-density polyethylene, polyisopropylene, polybutene, poly-4-methylpentene, poly-3-methylbutene-1, polyvinyl cycloalkane, polyvinyl trialkylsilane, branched type polylactic acid, a sodium salt of an ethylene-acrylate copolymer, a sodium salt of a styrene-maleic anhydride copolymer (so-called "ionomer"), benzylidene sorbitol and a derivative thereof, for example, dibenzylidene sorbitol, etc., are exemplified.

Of these, talc and at least one member selected from organic carboxylic acid metal salts are preferably used. The crystallization accelerator which is used in the present invention may be used alone, or may be used in combination of two or more kinds thereof.

A content of the crystallization accelerator is preferably 0.01 to 30 parts by weight, and more preferably 0.05 to 20 parts by weight based on 100 parts by weight of the resin containing, as a main component, a water-soluble monomer and having autocatalysis (component A).

<Filler>

The resin composition of the present invention can contain an organic or inorganic filler. When the resin composition contains a filler component, a molded article having excellent mechanical properties, heat resistance, and die moldability can be obtained.

Examples of the organic filler include chip fillers, such as rice husk chips, wooden chips, bean curd refuse, old paper crushed chips, apparel crushed chips, etc.; fibrous fillers, such as plant fibers including cotton fibers, hemp fibers, bamboo fibers, wooden fibers, kenaf fibers, jute fibers, banana fibers, coconut fibers, and the like, pulp or cellulose fibers processed from these plant fibers, animal fibers including silk, wool, Angora, cashmere, and camel fibers, and the like, and synthetic fibers including polyester fibers, nylon fibers, acrylic fibers, and the like; and powdery fillers, such as paper powders, wooden powders, cellulose powders, rice husk powders, fruit shell powders, chitin powders, chitosan powders, protein powders, starch powders, etc. From the viewpoint of moldability, powdery fillers, such as paper powders, wooden powders, bamboo powders, cellulose powders, kenaf powders, rice husk powders, fruit shell powders, chitin powders, chitosan powders, protein powders, starch powders, etc., are preferred, and paper powders, wooden powders, bamboo powders, cellulose powders, and kenaf powders are more preferred. Paper powders and wooden powders are still more preferred. Paper powders are especially preferred.

Although organic fillers collected directly from natural products may be used, organic fillers recycled from waste materials, such as used paper, waste timber, used clothing, etc., may also be used. Conifers, such as yellow pine, cedar, cypress, fir, etc., and broadleaf trees, such as beech, chinquapin, eucalyptus, etc., and the like are preferred as the timber.

From the viewpoint of moldability, paper powders containing an adhesive, especially an emulsion-based adhesive, such as a vinyl acetate resin-based emulsion, an acrylic resin-based emulsion, etc., which is generally used on the occasion of processing paper, or a hot melt adhesive, such as a polyvinyl alcohol-based adhesive, a polyamide-based adhesive, etc., or the like are preferably exemplified.

In the present invention, though a compounding amount of the organic filler is not particularly limited, from the viewpoints of moldability and heat resistance, it is preferably 1 to 300 parts by weight, more preferably 5 to 200 parts by weight, still more preferably 10 to 150 parts by weight, and especially preferably 15 to 100 parts by weight based on 100 parts by weight of the resin containing, as a main component, a water-soluble monomer and having autocatalysis (component A).

When the compounding amount of the organic filler is less than 1 part by weight, the effect for enhancing the moldability of the composition is small, whereas when it is more than 300 parts by weight, it is difficult to disperse the filler uniformly, or there may be a possibility that the strength and appearance as well as moldability and heat resistance of the composition as a material are deteriorated, and hence, such is not preferred.

It is preferred that the composition of the present invention contains an inorganic filler. By containing an inorganic filler, a composition having excellent mechanical properties, heat resistance, and moldability can be obtained. As the inorganic filler which is used in the present invention, a fibrous, platy, or powdery filler which is used for reinforcing an ordinary thermoplastic resin can be used.

Specifically, examples thereof include fibrous inorganic fillers, such as carbon nanotubes, glass fibers, asbestos fibers, carbon fibers, graphite fibers, metal fibers, potassium titanate whiskers, aluminum borate whiskers, magnesium-based whiskers, silicon-based whiskers, wollastonite, imogolite, sepiolite, asbestos, slug fibers, zonolite, gypsum fibers, silica fibers, silica-alumina fibers, zirconia fibers, boron nitride fibers, silicon nitride fibers, boron fibers, etc.; and platy or particulate inorganic fillers, such as stratiform silicates, stratiform silicates exchanged with an organic onium ion, glass flakes, non-swelling mica, graphite, metal foils, ceramic beads, talc, clay, mica, sericite, zeolite, bentonite, dolomite, kaolin, powdery silicic acid, feldspar powder, potassium titanate, silas balloon, calcium carbonate, magnesium carbonate, barium sulfate, calcium oxide, aluminum oxide, titanium oxide, aluminum silicate, silicon oxide, gypsum, novaculite, dosonite, carbon nanoparticles including white clay fullerene or the like, etc.

Specific examples of the stratiform silicate include smectite-based clay minerals, such as montmorillonite, beidellite, nontronite, saponite, hectorite, sauconite, etc.; various clay minerals, such as vermiculite, halocite, kanemite, kenyaite, etc.; swelling micas, such as Li type fluorine taeniolite, Na type fluorine taeniolite, Li type tetrasilicon fluorine mica, Na type tetrasilicon fluorine mica, etc.; and the like. These may be natural or synthetic. Of these, smectite-based clay minerals, such as montmorillonite, hectorite, etc., and swelling synthetic micas, such as Li type fluorine taeniolite, Na type tetrasilicon fluorine mica, etc., are preferred.

Of these inorganic fillers, fibrous or platy inorganic fillers are preferred, and glass fibers, wollastonite, aluminum borate whiskers, potassium titanate whiskers, mica, kaolin, and cation-exchanged stratiform silicates are especially preferred. An aspect ratio of the fibrous filler is preferably 5 or more, more preferably 10 or more, and still more preferably 20 or more.

Such a filler may be covered or bundled with a thermoplastic resin, such as an ethylene/vinyl acetate copolymer, etc., or a thermosetting resin, such as an epoxy resin, etc., or treated with a coupling agent, such as aminosilane, epoxysilane, etc.

A compounding amount of the inorganic filler is preferably 0.1 to 200 parts by weight, more preferably 0.5 to 100 parts by weight, still more preferably 1 to 50 parts by weight, especially preferably 1 to 30 parts by weight, and most preferably 1 to 20 parts by weight based on 100 parts by weight of the resin containing, as a main component, a water-soluble monomer and having autocatalysis (component A).

<Release Agent>

The resin composition of the present invention can contain a release agent. As the release agent which is used in the present invention, those which are used for ordinary thermoplastic resins can be used.

Specifically, examples of the release agent may include fatty acids, fatty acid metal salts, hydroxy fatty acids, paraffins, low-molecular weight polyolefins, fatty acid amides, alkylene bis-fatty acid amides, aliphatic ketones, fatty acid partially saponified esters, fatty acid lower alcohol esters, fatty acid polyhydric alcohol esters, fatty acid polyglycol esters, modified silicones, and the like. By compounding such a release agent, a polylactic acid molded article having excellent mechanical properties, moldability, and heat resistance can be obtained.

As the fatty acid, those having 6 to 40 carbon atoms are preferred, and specifically, examples thereof include oleic acid, stearic acid, lauric acid, hydroxystearic acid, behenic acid, arachidonic acid, linoleic acid, linolenic acid, ricinoleic acid, palmitic acid, montanic acid, and a mixture thereof, and the like. As the fatty acid metal salt, alkali metal salts or alkaline earth metal salts of a fatty acid having 6 to 40 carbon atoms are preferred, and specifically, examples thereof include calcium stearate, sodium montanate, calcium montanate, and the like.

Examples of the hydroxy fatty acid include 1,2-hydroxystearic acid and the like. As the paraffin, those having 18 carbon atoms or more are preferred, and examples thereof include liquid paraffin, natural paraffin, a microcrystalline wax, petrolactam, and the like.

As the low-molecular weight polyolefin, for example, those having a molecular weight of 5,000 or less are preferred, and specifically, examples thereof include a polyethylene wax, a maleic acid modified polyethylene wax, an oxide type polyethylene wax, a chlorinated polyethylene wax, a polypropylene wax, and the like. As the fatty acid amide, those having 6 or more carbon atoms are preferred, and specifically, examples thereof include oleic acid amide, erucic acid amide, behenic acid amide, and the like.

As the alkylene bis-fatty acid amide, those having 6 or more carbon atoms are preferred, and specifically, examples thereof include methylene bis-stearic acid amide, ethylene bis-stearic acid amide, N,N-bis(2-hydroxyethyl)stearic acid amide, and the like. As the aliphatic ketone, those having 6 or more carbon atoms are preferred, and examples thereof include higher aliphatic ketones and the like.

Examples of the fatty acid partially saponified ester include montanic acid partially saponified esters and the like. Examples of the fatty acid lower alcohol ester include stearic acid esters, oleic acid esters, linoleic acid esters, linolenic acid esters, adipic acid esters, behenic acid esters, arachidonic acid esters, montanic acid esters, isostearic acid esters, and the like.

Examples of the fatty acid polyhydric alcohol ester include glycerol tristearate, glycerol distearate, glycerol monostearate, pentaerythritoltetrastearate, pentaerythritol tristearate, pentaerythritol distearate, pentaerythritol monostearate, pentaerythritol adipate stearate, sorbitan monobehenate, and the like. Examples of the fatty acid polyglycol ester include polyethylene glycol fatty acid esters, polypropylene glycol fatty acid esters, and the like.

Examples of the modified silicone include polyether modified silicones, higher fatty acid alkoxy modified silicones, higher fatty acid-containing silicones, higher fatty acid ester modified silicones, methacrylic modified silicones, fluorine modified silicone, and the like.

Of these, fatty acids, fatty acid metal salts, hydroxy fatty acids, fatty acid esters, fatty acid partially saponified esters, paraffins, low-molecular weight polyolefins, fatty acid amides, and alkylene-bis fatty acid amides are preferred, and fatty acid partially saponified esters and alkylene-bis fatty acid amides are more preferred. Above all, montanic acid esters, montanic acid partially saponified esters, polyethylene waxes, oxidized polyethylene waxes, sorbitan fatty acid esters, erucic acid amide, and ethylene bis-stearic acid amide are still more preferred, and montanic acid partially saponified esters and ethylene bis-stearic acid amide are especially preferred.

The release agent may be used alone, or may be used in combination of two or more kinds thereof. A content of the release agent is preferably 0.01 to 3 parts by weight, and more preferably 0.03 to 2 parts by weight based on 100 parts by weight of the resin containing, as a main component, a water-soluble monomer and having autocatalysis (component A).

<Antistatic Agent>

The resin composition of the present invention can contain an antistatic agent. Examples of the antistatic agent include quaternary ammonium salt-based compounds, sulfonate-based compounds, and alkyl phosphate-based compounds, such as (β-lauramidepropionyl)trimethylammonium sulfate, sodium dodecylbenzenesulfonate, etc., and the like.

In the present invention, the antistatic agent may be used alone, or may be used in combination of two or more kinds thereof. A content of the antistatic agent is preferably 0.05 to 5 parts by weight, and more preferably 0.1 to 5 parts by weight based on 100 parts by weight of the resin containing, as a main component, a water-soluble monomer and having autocatalysis (component A).

<Plasticizer>

The resin composition of the present invention can contain a plasticizer. As the plasticizer, those which are generally known can be used. Examples thereof include polyester-based plasticizers, glycerin-based plasticizers, multivalent carboxylic acid ester-based plasticizers, phosphoric acid ester-based plasticizers, polyalkylene glycol-based plasticizers, epoxy-based plasticizers, and the like.

Examples of the polyester-based plasticizer include polyesters composed of an acid component, such as adipic acid, sebacic acid, terephthalic acid, isophthalic acid, naphthalenedicarboxylic acid, diphenyldicarboxylic acid, etc., and a diol component, such as ethylene glycol, propylene glycol, 1,3-propanediol, 1,3-butanediol, 1,4-butanediol, 1,6-hexanediol, diethylene glycol, etc.; polyesters composed of a hydroxycarboxylic acid, such as polycaprolactone, etc.; and the like. The ends of such a polyester may be sealed with a monofunctional carboxylic acid or a monofunctional alcohol.

Examples of the glycerin-based plasticizer include glycerin monostearate, glycerin distearate, glycerin monoacetomonolaurate, glycerin monoacetomonostearate, glycerin diacetomonooleate, glycerin monoacetomonomontanate, and the like.

Examples of the multivalent carboxylic acid-based plasticizer include phthalic acid esters, such as dimethyl phthalate, diethyl phthalate, dibutyl phthalate, diheptyl phthalate, dibenzyl phthalate, butylbenzyl phthalate, etc.; trimellitic acid esters, such as tributyl trimellitate, trioctyl trimellitate, trihexyl trimellitate, etc.; adipic acid esters, such as isodecyl adipate, n-decyl-n-octyl adipate, etc.; citric acid esters, such as tributyl acetylcitrate, etc.; azelaic acid esters, such as bis(2-ethylhexyl) azelate, etc.; and sebacic acid esters, such as dibutyl sebacate, bis(2-ethylhexyl) sebacate, etc.

Examples of the phosphoric acid ester-based plasticizer include tributyl phosphate, tris(2-ethylhexyl)phosphate, trioctyl phosphate, triphenyl phosphate, tricresyl phosphate, diphenyl-2-ethylhexyl phosphate, and the like.

Examples of the polyalkylene glycol-based plasticizer include polyalkylene glycols, such as polyethylene glycol, polypropylene glycol, polytetramethylene glycol, poly(ethylene oxide-propylene oxide) block and/or random copolymers, ethylene oxide addition polymers of a bisphenol, tetrahydrofuran addition polymers of a bisphenol, etc.; terminal-sealing compounds, such as terminal epoxy modified compounds, terminal ester modified compounds, and terminal ether modified compounds of these polyalkylene glycols, etc.; and the like.

Examples of the epoxy-based plasticizer include epoxy triglyceride composed of an alkyl epoxystearate and soybean oil, and an epoxy resin obtained from bisphenol A and epichlorohydrin as raw materials.

Specific examples of other plasticizer include benzoic acid esters of an aliphatic polyol, such as neopentyl glycol dibenzoate, diethylene glycol dibenzoate, triethylene glycol-bis(2-ethylbutyrate), etc.; fatty acid amides, such as stearic acid amide, etc.; fatty acid esters, such as butyl oleate, etc.; oxyacid esters, such as methyl acetyl ricinoleate, butyl acetyl ricinoleate, etc.; pentaerythritols; fatty acid esters of a pentaerythritol; various sorbitols; polyacrylic acid esters; silicone oil; paraffins; and the like.

As the plasticizer, at least one member selected from polyester-based plasticizers, polyalkylene-based plasticizers, glycerin-based plasticizers, pentaerythritols, and fatty acid esters of a pentaerythritol can be especially preferably used, and the plasticizer may be used alone or can also be used in combination of two or more kinds thereof.

A content of the plasticizer is preferably 0.01 to 30 parts by weight, more preferably 0.05 to 20 parts by weight, and still more preferably 0.1 to 10 parts by weight based on 100 parts by weight of the resin containing, as a main component, a water-soluble monomer and having autocatalysis (component A). In the present invention, the crystallization nucleating agent and the plasticizer may be used independently, and it is more preferred to use a combination of the both.

<Impact Resistance-Improving Agent>

The resin composition of the present invention can contain an impact resistance-improving agent. The impact resistance-improving agent is a material which can be used for improving the impact resistance of a thermoplastic resin and is not particularly limited. For example, at least one member selected among the following impact resistance-improving agents.

Specific examples of the impact resistance-improving agent include an ethylene-propylene copolymer, an ethylene-propylene-non-conjugated diene copolymer, an ethylene-butene-1 copolymer, various acrylic rubber, an ethylene-acrylic acid copolymer and an alkali metal salt thereof (so-called "ionomer"), an ethylene-glycidyl(meth)acrylate copolymer, an ethylene-acrylic acid ester copolymer (for example, an ethylene-ethyl acrylate copolymer and an ethylene-butyl acrylate copolymer), a modified ethylene-propylene copolymer, a diene rubber (for example, polybutadiene, polyisoprene, and polychloroprene), a diene-vinyl copolymer (for example, a styrene-butadiene random copolymer, a styrene-butadiene block copolymer, a styrene-butadiene-styrene block copolymer, a styrene-isoprene random copolymer, a styrene-isoprene block copolymer, a styrene-isoprene-styrene block copolymer, a polybutadiene-styrene graft copolymer, and a butadiene-acrylonitrile copolymer), polyisobutylene, a copolymer of isobutylene and butadiene or isoprene, a natural rubber, a Thiokol rubber, a polysulfide rubber, a polyurethane rubber, a polyether rubber, an epichlorohydrin rubber, and the like.

Furthermore, impact resistance-improving agents having a degree of crosslinking of every sort and various microstructures, for example, a cis-structure and a trans-structure, and core-shell type multilayer polymers, each composed of a core layer and at least one shell layer covering the core layer, or having adjacent layers made of different polymers, can also be used.

Furthermore, the various (co)polymers specifically exemplified above may be either a random copolymer or a block copolymer, and these can be used as the impact resistance-improving agent of the present invention.

A content of the impact resistance-improving agent is preferably 1 to 30 parts by weight, more preferably 5 to 20 parts by weight, and still more preferably 10 to 20 parts by weight based on 100 parts by weight of the resin containing, as a main component, a water-soluble monomer and having autocatalysis (component A).

<Others>

The resin composition of the present invention may contain a thermosetting resin, such as a phenol resin, a melamine resin, a thermosetting polyester resin, a silicone resin, an epoxy resin, etc., within the range where the gist of the present invention is not deviated.

The resin composition of the present invention may also contain a flame retardant, such as a bromine-based material, a phosphorus-based material, a silicone-based material, an antimony compound, etc., within the range where the gist of the present invention is not deviated.

The resin composition may also contain a colorant including an organic or inorganic dye or pigment, for example, an oxide, such as titanium dioxide, etc., a hydroxide, such as alumina white, etc., a sulfide, such as zinc sulfide, etc., a ferrocyanide compound, such as iron blue, etc., a chromate, such as zinc chromate, etc., a sulfate, such as barium sulfate, etc., a carbonate, such as calcium carbonate, etc., a silicate, such as ultramarine blue, etc., a phosphate, such as manganese violet, etc., carbon, such as carbon black, etc., a metal colorant, such as a bronze powder, an aluminum powder, etc., and the like.

The resin composition may also contain an additive including a condensation polycyclic colorant, for example, a nitroso-based condensation polycyclic colorant, such as Naphthol Green B, etc., a nitro-based condensation polycyclic colorant, such as Naphthol Yellow S, etc., an azo-based condensation polycyclic colorant, such as Naphthol Red, Chromophthal Yellow, etc., a phthalocyanine-based condensation polycyclic colorant, such as Phthalocyanine Blue, Fast Sky Blue, etc., Indanthrene Blue, and the like, and a slidability-improving agent, such as graphite, a fluorine resin, etc. These additives may be used alone or can also be used in combination of two or more kinds thereof.

<Molded Article>

A molded article made of the resin composition of the present invention can be formed by means of injection molding, extrusion molding, vacuum or pressure molding, blow molding, or the like. Examples of the molded article include a pellet, a fiber, a textile, a fiber structure, a film, a sheet, a sheet nonwoven fabric, and the like.

The melt molding method of the pellet made of the resin composition of the present invention is not limited at all, and pellets produced by a known pellet production method can be suitably used.

That is, though methods, such as a method in which the resin composition extruded into a strand or plate is cut in air or water after the resin is completely solidified, or while it is still molten and not completely solidified, etc., are conventionally known, all of those methods can be suitably applied in the present invention.

For the injection molding, molding conditions may be properly set according to the type of the resin containing, as a main component, a water-soluble monomer and having autocatalysis (component A). However, from the viewpoints of promoting the crystallization and the molding cycle of a molded article at the time of injection molding, for example, when the resin containing, as a main component, a water-soluble monomer and having autocatalysis (component A) is polylactic acid, a die temperature is preferably 30° C. or higher, more preferably 60° C. or higher, and still more preferably 70° C. or higher. However, in order to prevent the deformation of a molded article, the die temperature is preferably 140° C. or lower, more preferably 120° C. or lower, and still more preferably 110° C. or lower.

Examples of such a molded article include various housings, electric and electronic parts, such as toothed wheels, gears, etc., construction members, civil engineering members, agricultural materials, automobile parts (interior and exterior parts, etc.), parts for daily use, and the like.

As for the fiber and the fiber structure made of the resin composition of the present invention, materials obtained by ordinary melt spinning and post-processing after that can be suitably used.

That is, the resin containing, as a main component, a water-soluble monomer and having autocatalysis (component A) is melted by an extruder type or pressure melter type melt extruder, weighed by a gear pump, filtered within a pack, and then discharged as a monofilament or a multifilament, or the like from nozzles provided in a spinneret.

The shape and number of spinnerets are not particularly limited, and all of a circular type, an atypical type, a solid type, a hollow type, and the like can be adopted. The discharged yarn is immediately cooled and solidified, and thereafter, the resultant is bundled, applied with a lubricant, and wound up. Although a winding rate is not particularly limited, it is preferably in the range of 100 m/min to 5,000 m/min because a stereocomplex crystal is easily formed when the resin containing, as a main component, a water-soluble monomer and having autocatalysis (component A) is stereocomplex polylactic acid.

Although the wound unstretched yarn can be used as it is, it can also be stretched and used.

In the case of using the yarn in an unstretched state, it is preferred to perform a heat treatment at a temperature equal to or higher than the glass transition temperature (Tg) and lower than the melting point of the resin containing, as a main component, a water-soluble monomer and having autocatalysis (component A) after spinning and before winding up. Arbitrary means, such as a contact type heater, a non-contact hot plate, etc., can be adopted for the heat treatment besides a hot roller.

In the case of performing stretching, a spinning step and a stretching step are not always needed to be separated from each other, and a direct spinning/stretching method in which after spinning, stretching is subsequently performed without once winding up the spun yarn may be adopted.

Stretching may be performed in one stage or two or more multiple stages, and from the viewpoint of fabricating a high-strength fiber, a draw ratio is preferably 3 times or more, and more preferably 4 times or more. The draw ratio is preferably selected from 3 to 10 times. However, when the draw ratio is too high, the fiber is devitrified and whitened, whereby the strength of the fiber is lowered, and rupture elongation becomes too small for a fiber application, and hence, such is not preferred.

As for a preheating method for stretching, besides temperature elevation of a roll, a plate-like or pin-like contact heater, a non-contact hot plate, a heat medium bath, and the like may be adopted. However, commonly used means may be adopted.

It is preferred that after spinning, the heat treatment is subsequently performed at a temperature equal to or higher than the glass transition temperature (Tg) and lower than the melting point of the resin containing, as a main component, a water-soluble monomer and having autocatalysis (component A) before winding up.

Besides a hot roller, arbitrary means, such as a contact heater, a non-contact hot plate, etc., can be adopted for the heat treatment.

For example, when the resin containing, as a main component, a water-soluble monomer and having autocatalysis (component A) is polylactic acid, a stretching temperature is selected within the range of the glass transition temperature (Tg) to 170° C., preferably 60° C. to 140° C., and especially preferably 70° C. to 130° C.

The fiber obtained from the resin composition of the present invention may be a short fiber. In the case of producing a short fiber, in addition to a stretching method of a long fiber, a step of cutting in a prescribed fiber length according to an application by using a rotary cutter or the like is added, and in the case where crimping is further needed, a step of imparting crimps by using a forced crimper or the like is added between a fixed-length heat treatment and a relaxation heat treatment. On that occasion, in order to increase crimp-imparting properties, preheating can be performed by using steam, an electric heater, or the like before the crimper.

When the resin containing, as a main component, a water-soluble monomer and having autocatalysis (component A) is stereocomplex polylactic acid, a polylactic acid fiber having a high stereocomplex crystallization degree (S), low heat shrinkage, and a strength of 3.5 cN/dTex or more can also be obtained by heat setting at 170 to 220° C. under a tension after stretching.

Fibers and fiber structures obtained from the resin composition of the present invention may be used as fibers made of the resin composition alone or can be mixed with another type of fibers. Examples of the mixture include not only various combinations with a fiber structure made of another type of fibers but also a combined filament yarn with another type of fibers, a composite false twisted yarn, a blended yarn, a long/short composite yarn, a fluid processed yarn, a covering yarn, a twisted yarn, a combined weave, a combined knitting, a pile fabric, a cotton mixing/wadding, a long fiber or short fiber mixed nonwoven fabric, a felt, and the like. When another type of fibers are used together, a mixing ratio of the fibers is selected within the range of preferably 1% by weight or more, more preferably 10% by weight or more, and still more preferably 30% by weight in order to exhibit the characteristic features of the resin composition.

Examples of the another type of fibers to be mixed include cellulose fibers, such as cotton, hemp, rayon, and tencel fibers, etc.; wool, silk, acetate, polyester, nylon, acrylic, vinylon, polyolefin, and polyurethane fibers; and the like.

The film or sheet obtained from the resin composition of the present invention can be molded by a conventionally known method. For example, in the film or sheet, molding techniques, such as extrusion molding, cast molding, etc., can be adopted. That is, molding can be performed by extruding an unstretched film by using an extruder having a T die or circular die or the like installed therein, or the like and further stretching and heating. At this time, the unstretched film can be directly put into practical use as a sheet. In forming a film, not only a material obtained by melt kneading the resin composition and the above-described various components in advance can be used, but also these components can be molded through melt kneading at the time of extrusion molding. An unstretched film having few surface defects can be obtained by compounding an electrostatic adhesive, such as a quaternary phosphonium sulfonate, etc. with the molten resin at the time of extruding an unstretched film.

An unstretched film can also be cast molded by dissolving the resin composition and the additive components in a common solvent, for example, chloroform, methylene dichloride, or the like, and casting the resulting solution, followed by drying for solidification. The unstretched film can be subjected to vertical uniaxial stretching in a mechanical flow direction or horizontal uniaxial stretching in a direction orthogonal to the mechanical flow direction. A biaxially stretched film can be produced by performing a sequential biaxial stretching method of roller stretching and tenter stretching, a simultaneous biaxial stretching method by tenter stretching, a biaxial stretching method by tubular stretching, or other means. Furthermore, the film is generally heat set after stretching for the purpose of suppressing its heat shrinkage or the like. If desired, the thus-obtained stretched film may also be subjected to a surface activation treatment, such as a plasma treatment, an amine treatment, or a corona treatment, in accordance with a conventionally known method.

The film or sheet of the present invention may be used alone or in combination with another type of a film or sheet. As the combination form, not only various combinations with a film or sheet made of another material, for example, in a form of a stack, a laminate, and the like, but also combinations with another form, such as an injection molded article, a fiber structure, etc. may be exemplified.

The second invention of the present application is hereunder explained in detail.

The resin composition of the present invention is a resin composition including an aliphatic polyester containing, as a main component, a water-soluble monomer (component C) and a hydrolysis regulator having reactivity with an acidic group in a 15% hydrochloric acid aqueous solution at 100° C. of 30% or more (component D), the resin composition satisfying any one of the following J1 to J2:

J1: In the 15% hydrochloric acid aqueous solution at 100° C., after 6 hours, a weight average molecular weight retention rate of the resin composition is 50% or more, and after 24 hours, a weight of a water-insoluble matter of the resin composition is 50% or less; and J2: In the 15% hydrochloric acid aqueous solution at 120° C., after 1 hour, a weight average molecular weight retention rate of the resin composition is 50% or more, and after 24 hours, a weight of a water-insoluble matter of the resin composition is 50% or less.

<Aliphatic Polyester Containing, as a Main Component, a Water-Soluble Monomer (Component C)>

In the present invention, in the aliphatic polyester containing, as a main component, a water-soluble monomer (component C), the monomer generated by decomposition exhibits solubility in water, and the resin in which an acidic group generated by decomposition has autocatalysis, or at least a part of ends of the resin is sealed by the hydrolysis regulator (component D).

The term "water-soluble" referred to herein means that the solubility in water at 25° C. is 0.1 g/L or more. From the viewpoint that the resin composition to be used does not remain after decomposition, the solubility in water of the water-soluble monomer is preferably 1 g/L or more, more preferably 3 g/L or more, and still more preferably 5 g/L or more.

The "main component" means that it occupies 90 mol % or more of the constituent components. A proportion of the main component is preferably 95 to 100 mol %, and more preferably 98 to 100 mol %.

Examples of the component C include known aliphatic polyesters.

Examples of the aliphatic polyester include polymers containing an aliphatic hydroxycarboxylic acid as a main constituent component, polymers obtained by polycondensing an aliphatic multivalent carboxylic acid or an ester forming derivative and an aliphatic polyhydric alcohol as main components, and copolymers thereof.

The polymer containing an aliphatic hydroxycarboxylic acid as a main constituent component and the polymer containing an aliphatic multivalent carboxylic acid and an aliphatic polyhydric alcohol as main constituent components are the same as in the description of the component A in the foregoing first invention of the present application.

<Hydrolysis Regulator (Component D)>

In the present invention, the hydrolysis regulator (component D) is an agent for regulating hydrolysis properties by sealing an end group of the aliphatic polyester containing, as a main component, a water-soluble monomer (component C) and an acidic group generated by decomposition. That is, the hydrolysis regulator (component D) is an agent having an effect for inhibiting the autocatalysis of the aliphatic polyester containing, as a main component, a water-soluble monomer (component C) to delay the hydrolysis.

As the acidic group, at least one member selected from the group consisting of a carboxyl group, a sulfonic acid group, a sulfinic acid group, a phosphonic acid group, and a phosphinic acid group is exemplified. In the present invention, a carboxyl group is especially exemplified.

Since a condition to be used is one in hot water under a chemically severe condition, such as an acidic or basic condition, etc., the hydrolysis regulator (component C) has reactivity with an acidic group in a 15% hydrochloric acid aqueous solution at 100° C. of 30% or more.

The reactivity with an acidic group in a 15% hydrochloric acid aqueous solution at 100° C. as referred to herein is, for example, a value obtained by evaluating a carboxyl group concentration regarding a resin composition after treating the resin composition in 15% hydrochloric acid for 3 hours, the resin composition being obtained by adding 5 parts by weight of the hydrolysis regulator to 95 parts by weight of polylactic acid for evaluation, followed by melt kneading under a nitrogen atmosphere at a resin temperature of 200° C. and at a rotation rate of 30 rpm for 2 minutes by using a Labo Plasto mill (manufactured by Toyo Seiki Seisaku-Sho, Ltd.), and using a carboxyl group concentration after similarly treating polylactic acid for evaluation in a 15% hydrochloric acid aqueous solution at 100° C. for 3 hours, the value being given according to the following equation (vi).

$$\text{Reactivity}(\%) = [\{(\text{Carboxyl group concentration of polylactic acid for evaluation after treatment in 15\% hydrochloric acid aqueous solution at 100° C. for 3hours}) - (\text{Carboxyl group concentration of resin composition after treatment in 15\% hydrochloric acid aqueous solution at 100° C. for 3hours})\} / (\text{Carboxyl group concentration of polylactic acid for evaluation after treatment in 15\% hydrochloric acid aqueous solution at 100° C. for 3hours})] \times 100 \qquad \text{(vi)}$$

Here, the treatment in a 15% hydrochloric acid aqueous solution at 100° C. was performed in the following manner. That is, a glass-made screw-capped test tube (manufactured by Maruemu Corporation, NN-13, capacity: about 5 mL) was charged with 150 mg of a resin composition (one having been previously crystallized by a heat treatment at 110° C. for 10 minutes and having a chip-like shape of 0.5 mm to 2 mm in each side) and 3 mL of a 15% hydrochloric acid aqueous solution (one prepared by diluting hydrochloric acid (manufactured by Wako Pure Chemical Industries, Ltd., Special grade, 35 to 37%) with distilled water), hermetically sealed, and allowed to stand for 3 hours within a hot air dryer (manufactured by Toyo Seiki Seisaku-Sho, Ltd., FC-410) which had been kept at 100° C. in advance. Thereafter, the test tube was taken out and cooled in a hermetically sealed state to ordinary temperature (25° C.) by means of water cooling. Thereafter, the sample obtained after filtration was washed 5 times with 5 mL of an acetone/water (70/30) mixed liquid and dried, and then, the carboxyl group was measured. The polylactic acid for evaluation was treated in the same manner.

The polylactic acid for evaluation is preferably one having a weight average molecular weight of 120,000 to 200,000 and a carboxyl group concentration of 10 to 30 equivalents/ton. As such polylactic acid, polylactic acid "NW3001D", manufactured by NatureWorks LLC (MW: 150,000, carboxyl group concentration: 24.1 equivalents/ton) and the like can be suitably used. Besides, the reactivity with an acidic group may be given by the same evaluation.

In the case of evaluating a stable agent for the reactivity, an effect for controlling an increase of the carboxyl group concentration of the resin composition is small. In the case of using such an agent in hot water under a chemically severe condition, such as an acidic or basic condition, etc., the ability for sealing the target acidic group is not much exhibited, and therefore, the effect for inhibiting the decomposition of the aliphatic polyester containing, as a main component, a water-soluble monomer (component C) is low.

In view of the foregoing, the reactivity with an acidic group in the 15% hydrochloric acid aqueous solution at 100° C. is preferably 30% or more, more preferably 40% or more, and especially preferably 50% or more. That is, when the reactivity is 50% or more, namely the reactivity with an acidic group in the 15% hydrochloric acid aqueous solution is high, the reaction with the acidic group can be efficiently performed under the condition of the instant application.

Examples of the hydrolysis regulator (component D) include addition reaction type compounds, such as carbodiimide compounds, isocyanate compounds, epoxy compounds, oxazoline compounds, oxazine compounds, aziridine compounds, etc. These compounds can also be used in combination of two or more thereof. From the viewpoints of reactivity with an acidic group, carbodiimide compounds and epoxy compounds are preferably exemplified.

As the carbodiimide compound, all of monofunctional carbodiimide compounds and bifunctional or polyfunctional carbodiimide compounds can be used, and a compound having a basic structure represented by the following general formula (I), (II). or (III) can be exemplified.

$$R-N=C=N-R' \tag{I}$$

(In the formula, each of R and R' is independently an aliphatic group having 1 to 20 carbon atoms, an alicyclic group having 3 to 20 carbon atoms, an aromatic group having 5 to 15 carbon atoms, or a combination thereof, and may contain a hetero atom; and R and R' may be bonded to each other to form a cyclic structure, and may form two or more cyclic structures through a Spiro structure or the like.)

(In the formula, each R" is independently an aliphatic group having 1 to 20 carbon atoms, an alicyclic group having 3 to 20 carbon atoms, an aromatic group having 5 to 15 carbon atoms, or a combination thereof, and may contain a hetero atom; and n is an integer of 2 to 1,000.)

(In the formula, Q is a divalent to tetravalent bonding group that is an aliphatic group, an alicyclic group, an aromatic group, or a combination thereof and may contain a hetero atom or a substituent.)

From the viewpoint of keeping the molecular weight, bifunctional or polyfunctional carbodiimide compounds are preferred. Examples thereof include carbodiimide compounds represented by the following formulae (6) and (7).

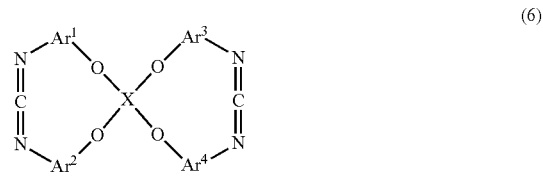

(In the formula, X is a tetravalent group represented by the following formula (6-1); and each of $Ar^1$ to $Ar^4$ is independently an orthophenylene group or a 1,2-naphthalene-diyl group, each of which may be substituted with a substituent.)

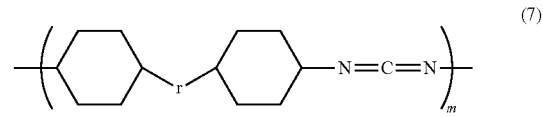

(In the formula, each r is independently an aliphatic group having 1 to 20 carbon atoms, an alicyclic group having 3 to 20 carbon atoms, an aromatic group having 5 to 15 carbon atoms, or a combination thereof and may contain a hetero atom; and m is an integer of 2 to 1,000.)

Specific examples of such an aromatic compound include a cyclic carbodiimide represented by the following formula (8), polymers composed of 4,4'-dicyclohexylmethane carbodiimide as a monomer, polymers composed of tetramethylxylylene carbodiimide as a monomer, and derivatives thereof, and the like.

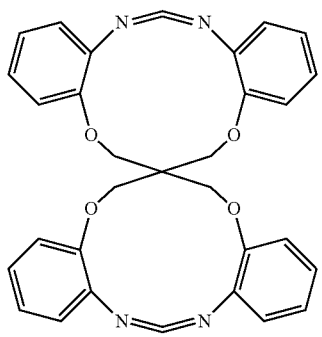

(8)

As the epoxy compound, all of monofunctional epoxy compounds and bifunctional or polyfunctional epoxy compounds can be used, and examples thereof include alicyclic epoxy compounds, epoxidized vegetable oils obtained by epoxidizing a vegetable oil, epoxy compounds having a glycidyl group, and the like.

From the viewpoint of keeping the molecular weight, bifunctional or polyfunctional epoxy compounds are preferred.

Examples of such an epoxy compound include alicyclic epoxy compounds, such as 3,4-epoxycyclohexenylmethyl-3',4'-epoxycyclohexene carboxylate, ε-caprolactone-modified 3,4-epoxycyclohexylmethyl-3',4'-epoxycyclohexane carboxylate, epoxidized 3-cyclohexene-1,2-dicarboxylic acid bis(3-cyclohexenylmethyl)-modified ε-caprolactone, epoxidized butanetetracarboxylic acid tetrakis-(3-cyclohexenylmethyl)-modified ε-caprolactone, etc., diglycidyl ether compounds, and the like. Above all, 3,4-epoxycyclohexenylmethyl-3',4'-epoxycyclohexene carboxylate can be suitably used.

<Resin Composition>

The resin composition of the second invention of the present application satisfies any one of the following J1 to J2:

J1: In the 15% hydrochloric acid aqueous solution at 100° C., after 6 hours, a weight average molecular weight retention rate of the resin composition is 50% or more, and after 24 hours, a weight of a water-insoluble matter of the resin composition is 50% or less; and J2: In the 15% hydrochloric acid aqueous solution at 120° C., after 1 hour, a weight average molecular weight retention rate of the resin composition is 50% or more, and after 24 hours, a weight of a water-insoluble matter of the resin composition is 50% or less.

In order that the resin composition of the present invention may exhibit the desired performance, it is important to control the resin composition so as to be quickly decomposed after keeping the weight and shape of the resin in hot water under a chemically severe condition, such as an acidic or basic condition, etc., for a fixed period of time.

Although the fixed period of time is determined according to an application, it is preferably any of 10 minutes to 12 hours. From the viewpoint of exhibiting the desired performance, the fixed period of time is more preferably any of 30 minutes to 10 hours, and still more preferably any of 30 minutes to 8 hours.

As for the matter of keeping the weight and shape of the resin, it is preferred that the weight of the water-insoluble matter of the resin composition is 50% or more; and that the amount of volume change expressing the shape is 50% or less. For example, even when the weight of the water-insoluble matter of the resin composition is 50% or more, if it is in the completely hydrolyzed state, it may not be said that the weight and shape of the resin are kept. From the viewpoint of exhibiting the desired performance, the weight of the water-insoluble matter of the resin composition is more preferably 60% or more, and still more preferably 70% or more. The amount of volume change expressing the shape is more preferably 40% or less, and still more preferably 30% or less.

The weight and shape of the resin largely relies upon the weight average molecular weight of the resin composition. That is, the resin composition in which decomposition of the resin proceeds, and the weight average molecular weight becomes low cannot keep the weight and shape of the resin, and the desired performance cannot be exhibited in the instant application.

Although it is needed to not only keep the weight and shape but also keep the mechanical physical properties in order to effectively exhibit the function in the instant application, it is important to keep the weight average molecular weight from these viewpoints.

In consequence, it is important to keep the weight average molecular weight in hot water under a chemically severe condition, such as an acidic or basic condition, etc., for a fixed period of time, and the weight average molecular weight retention rate of the resin composition of the present invention is preferably 50% or more. When the weight average molecular weight retention rate is lower than 50%, there may be the case where the mechanical physical properties are lowered, and furthermore, changes in the weight and shape become remarkable. For that reason, from the viewpoint of exhibiting the desired performance, the weight average molecular weight retention rate is more preferably 60% or more, and still more preferably 70% or more.

Here, the weight of the water-insoluble matter and the weight average molecular weight retention rate of the resin are, for example, values given by the following evaluations.

A glass-made screw-capped test tube (manufactured by Maruemu Corporation, NN-13, capacity: about 5 mL) is charged with 50 mg of a resin composition (one having been previously crystallized by a heat treatment at 110° C. for 10 minutes and having a chip-like shape of 0.5 mm to 2 mm in each side) and 1 mL of a 15% hydrochloric acid aqueous solution and hermetically sealed.

The 15% hydrochloric acid aqueous solution is prepared by diluting hydrochloric acid (manufactured by Wako Pure Chemical Industries, Ltd., Special grade, 35 to 37%) with distilled water and subjected to neutralization titration with a sodium hydroxide aqueous solution standard liquid, thereby confirming the concentration.

In the case where the test temperature is 100° C. or lower, the above-described test tube is allowed to stand within a hot air dryer (manufactured by Toyo Seiki Seisaku-Sho, Ltd., FC-410) having been kept at a prescribed temperature in advance. After elapsing a prescribed time, the test tube is taken out and cooled to ordinary temperature (25° C.) in a hermetically sealed state of the test tube by means of water cooling.

In the case where the test temperature is higher than 100° C. and 130° C. or lower, the above-described test tube is allowed to stand within a pressure cooker (manufactured by Espec Corporation, HAS Chamber EHS-221M). After the temperature within the pressure cooker reaches the test temperature, and then a prescribed time elapses, the temperature decrease is commenced. After 10 minutes, the test tube is taken out from the pressure cooker and cooled to ordinary temperature (25° C.) in a hermetically sealed state of the test tube by means of water cooling.

After cooling the test tube to ordinary temperature (25° C.), the test tube is opened, the resin composition in the interior is filtered using a glass filter (manufactured by Sibata Scientific Technology Ltd., 3GP100, pore size: 40 to 100 μm), and the resin composition remaining on the glass filter is washed with a large amount of distilled water. The washed resin composition is dried at ordinary temperature (25° C.) under a vacuum of 133.3 Pa or less for 1 hour, and thereafter, the weight of the resin composition is measured. The weight of the water-insoluble matter is calculated according to the following equation (vii).

Weight of water-insoluble matter(%)=[(Weight of resin composition recovered by filtration after decomposition test)÷(Weight of resin composition before decomposition test)]×100    (vii)

With respect to the resin composition after the decomposition test, the weight average molecular weight (Mw) is measured by means of gel permeation chromatography (GPC), and its value is designated as Mw1. Mw of the resin composition before the above-described decomposition test is measured by means of GPC, and its value is designated as Mw0. The weight average molecular weight retention rate is calculated according to the following equation (viii).

Weight average molecular weight retention rate(%)= [Mw1/Mw0]×100    (viii)

Besides, the weight average molecular weight change rate of the resin may also be given by the equivalent evaluation.

The resin composition of the present invention satisfies any one of the following J1 to J2:
J1: In the 15% hydrochloric acid aqueous solution at 100° C., after 6 hours, a weight average molecular weight retention rate of the resin composition is 50% or more, and after 24 hours, a weight of a water-insoluble matter of the resin composition is 50% or less; and
J2: In the 15% hydrochloric acid aqueous solution at 120° C., after 1 hour, a weight average molecular weight retention rate of the resin composition is 50% or more, and after 24 hours, a weight of a water-insoluble matter of the resin composition is 50% or less.

The range where the resin composition of the present invention can be suitably used varies with the temperature. In J1 to J2, at a time earlier than after the prescribed fixed period of time (6 hours or 1 hour), the weight average molecular weight retention rate of the resin composition is preferably 50% or more.

In J1, it is expressed that the fixed period of time is 6 hours and during that time, the weight average molecular weight of the resin composition is kept, and the weight and shape of the resin are kept at desired levels. From the viewpoint of exhibiting the desired performance in the excavation technology in the oil field or the like, in hot water under a chemically severe condition, such as an acidic or basic condition, etc., after a fixed period of time longer than 6 hours as defined in the present invention, the weight average retention rate of the resin composition may be 50% or more.

In J2, it is expressed that the fixed period of time is 1 hour and during that time, the weight average molecular weight of the resin composition is kept, and the weight and shape of the resin are kept at desired levels. From the viewpoint of exhibiting the desired performance in the excavation technology in the oil field or the like, in hot water under a chemically severe condition, such as an acidic or basic condition, etc., after a fixed period of time longer than 1 hour as defined in the present invention, the weight average retention rate of the resin composition may be 50% or more.

After the fixed period of time prescribed in each of J1 to J2 (6 hours or 1 hour), the effect for sealing the acidic group by the hydrolysis regulator (component D) vanishes, the decomposition of the resin is promoted due to the autocatalysis of the acidic group, and following that, the weight average molecular weight is abruptly lowered. Furthermore, when the decomposition proceeds, the resin becomes a water-soluble monomer, whereby it becomes soluble in water. The matter that the instant phenomenon occurs quickly as far as possible after the weight and shape of the resin are kept for a fixed period of time is suitable on the occasion of using the resin composition of the present invention in the excavation technology in the oil field or the like. For that reason, it is preferred that after 24 hours, the weight of the water-insoluble matter of the resin composition is 50% or less. For the foregoing reason, it is more preferred that after 18 hours, the weight of the water-insoluble matter of the resin composition is 50% or less; it is still more preferred that after 12 hours, the weight of the water-insoluble matter of the resin composition is 50% or less; and it is yet still more preferred that after 8 hours, the weight of the water-insoluble matter of the resin composition is 50% or less.

As for the resin composition of the present invention, it is preferred that in the 15% hydrochloric acid aqueous solution at an arbitrary temperature of 100° C. or higher and 120° C. or lower, after 72 hours, the weight of the water-insoluble matter of the resin composition is 10% or less. For example, on the occasion of using the resin composition in the excavation technology in the oil field or the like, the resin composition is dissolved in water quickly after keeping the weight and shape of the resin for a fixed period of time, whereby it can effectively work. For that reason, it is preferred that in the 15% hydrochloric acid aqueous solution at an arbitrary temperature of 100° C. or higher and 120° C. or lower, after 72 hours, the weight of the water-insoluble matter of the resin composition is 10% or less.

From the viewpoints of treatment in water after the use and exhibition of the desired performance, the water-insoluble matter is low as far as possible, and after 72 hours, the weight of the water-insoluble matter of the resin composition is more preferably 7% or less, still more preferably 5% or less, and especially preferably 1% or less.

In the resin composition of the present invention, a content of the hydrolysis regulator (component D) is 0.1 to 20 parts by weight on the basis of 100 parts by weight of a total sum of the aliphatic polyester containing, as a main component, a water-soluble monomer (component C) and the hydrolysis regulator (component D). When the content of the hydrolysis regulator (component D) is less than 0.1 parts by weight, there may be the case where the sufficient effect for sealing the acidic group and the sufficient effect for keeping the molecular weight are not exhibited in hot water under a chemically severe condition, such as an acidic or basic condition, etc. When it is more than 20 parts by weight, there may be the case where bleedout of the hydrolysis regulator (component D) from the resin composition, worsening of moldability, or degeneration of properties of a substrate takes place. From such viewpoints, the addition amount of the hydrolysis regulator (component D) is more preferably 0.5 to 10 parts by weight, and still more preferably 1.0 to 7.0 parts by weight on the basis of 100 parts by weight of a total sum of the aliphatic polyester containing, as a main component, a water-soluble monomer (component C) and the hydrolysis regulator (component D).

<Production Method of Resin Composition>

The resin composition of the present invention can be produced by melt kneading the aliphatic polyester containing, as a main component, a water-soluble monomer and the hydrolysis regulator (component D).

Incidentally, in the case of adopting polylactic acid as the aliphatic polyester containing, as a main component, a water-soluble monomer (component C), poly(L-lactic acid) and poly(D-lactic acid), each of which is the aliphatic polyester containing, as a main component, a water-soluble monomer and having autocatalysis (component C), and the hydrolysis regulator (component D) are mixed to form a stereocomplex polylactic acid, and simultaneously, the resin composition of the present invention can also be produced. The resin composition of the present invention can also be produced by mixing poly(L-lactic acid) and poly(D-lactic acid) to form stereocomplex polylactic acid and then mixing the hydrolysis regulator (component D).

The method of adding the hydrolysis regulator (component D) to the aliphatic polyester containing, as a main component, a water-soluble monomer (component C) and mixing them is not particularly limited, and a conventionally known method, such as a method of adding as a solution, a melt, or a master batch of the aliphatic polyester containing, as a main component, a water-soluble monomer (component C) to be applied; a method of bringing a solid of the aliphatic polyester containing, as a main component, a water-soluble monomer (component C) into contact with a liquid having the hydrolysis regulator (component D) dissolved, dispersed or melted therein, thereby penetrating the hydrolysis regulator (component D) thereinto; and the like can be adopted.

In the case of adopting a method of adding as a solution, a melt, or a master batch of the aliphatic polyester containing, as a main component, a water-soluble monomer (component C) to be applied, a method of addition using a conventionally known kneading device can be adopted. On the occasion of kneading, a kneading method in a solution state or a kneading method in a molten state is more preferred from the viewpoint of uniform kneading properties. The kneading device is not particularly limited, and conventionally known vertical reaction vessels, mixing tanks, and kneading tanks, or single-screw or multi-screw horizontal kneading devices, for example, single-screw or multi-screw extruders and kneader, and the like are exemplified. A mixing time is not particularly specified, and though it varies with the mixing device or mixing temperature, a time of 0.1 minutes to 2 hours, preferably 0.2 minutes to 60 minutes, and more preferably 0.2 minutes to 30 minutes is selected.

As the solvent, those which are inert to the aliphatic polyester containing, as a main component, a water-soluble monomer (component C) and the hydrolysis regulator (component D) can be used. In particular, a solvent which has an affinity with the both components and at least partially dissolves the both components therein.

As the solvent, for example, hydrocarbon-based solvents, ketone-based solvents, ester-based solvents, ether-based solvents, halogen-based solvents, amide-based solvents, and the like can be used.

Examples of the hydrocarbon-based solvent include hexane, cyclohexane, benzene, toluene, xylene, heptane, decane, and the like. Examples of the ketone-based solvent include acetone, methyl ethyl ketone, diethyl ketone, cyclohexanone, isophorone, and the like.

Examples of the ester-based solvent include ethyl acetate, methyl acetate, ethyl succinate, methyl carbonate, ethyl benzoate, diethylene glycol diacetate, and the like.

Examples of the ether-based solvent include diethyl ether, dibutyl ether, tetrahydrofuran, dioxane, diethylene glycol dimethyl ether, triethylene glycol diethyl ether, diphenyl ether, and the like. Examples of the halogen-based solvent include dichloromethane, chloroform, tetrachloromethane, dichloroethane, 1,1',2,2'-tetrachloroethane, chlorobenzene, dichlorobenzene, and the like. Examples of the amide-based solvent include formamide, N,N-dimethylformamide, N,N-dimethylacetamide, N-methyl-2-pyrrolidone, and the like. These solvents can be used alone or as a mixed solvent, if desired.

In the present invention, the solvent is applied in an amount in the range of 1 to 1,000 parts by weight based on 100 parts by weight of the resin composition. When the amount of the solvent is less than 1 part by weight, there is no meaning for the application of the solvent. Although an upper limit value of the use amount of the solvent is not particularly limited, it is about 1,000 parts by weight from the viewpoints of operability and reaction efficiency.

In the case of adopting a method of bringing a solid of the aliphatic polyester containing, as a main component, a water-soluble monomer (component C) into contact with a liquid having the hydrolysis regulator (component D) dissolved, dispersed or melted therein, thereby penetrating the hydrolysis regulator (component D) thereinto, a method of bringing a solid of the aliphatic polyester containing, as a main component, a water-soluble monomer (component B) into contact with the hydrolysis regulator (component D) dissolved in a solvent as described above; a method of bringing a solid of the resin containing, as a main component, a water-soluble monomer and having autocatalysis (component C) into contact with an emulsion liquid of the hydrolysis regulator (component D); and the like can be adopted.

As the contacting method, a method of dipping the aliphatic polyester containing, as a main component, a water-soluble monomer (component C); a method of coating the aliphatic polyester containing, as a main component, a water-soluble monomer (component C); a method of spraying on the aliphatic polyester containing, as a main component, a water-soluble monomer (component C); and the like can be suitably adopted.

Although it is possible to perform a sealing reaction of the acidic group of the aliphatic polyester containing, as a main component, a water-soluble monomer (component C) with the hydrolysis regulator (component D) at a temperature of room temperature (25° C.) to about 300° C., the sealing reaction is more promoted at a temperature in the range of preferably 50 to 280° C., and more preferably 100 to 280° C. from the viewpoint of reaction efficiency. As for the aliphatic polyester containing, as a main component, a water-soluble monomer (component C), the reaction is liable to be more advanced at a temperature at which it is melted; however, in order to inhibit volatilization, decomposition, or the like of the hydrolysis regulator (component D), it is preferred to perform the reaction at a temperature lower than 300° C. For the purposes of lowering the melting temperature of the aliphatic polyester containing, as a main component, a water-soluble monomer (component C) and increasing the stirring efficiency, it is effective to apply a solvent.

Although the reaction is sufficiently rapidly advanced in the absence of a catalyst, a catalyst for promoting the reaction can also be used. As the catalyst, catalysts which are generally used for the hydrolysis regulator (component B) can be applied. These can be used alone or in combination of two or more kinds thereof. Although an addition amount of the catalyst is not particularly limited, it is preferably 0.001 to 1 part by weight, more preferably 0.01 to 0.1 parts by weight, and most preferably 0.02 to 0.1 parts by weight based on 100 parts by weight of the resin composition.

In the present invention, the hydrolysis regulator (component D) may be used in a combination of two or more kinds thereof. For example, with respect to the hydrolysis regulator (component D) for performing the sealing reaction of the acidic group at the early stage of the aliphatic polyester containing, as a main component, a water-soluble monomer (component C) and the hydrolysis regulator (component D) for performing the sealing reaction of the acidic group in acidic water, separate materials may be used.

Furthermore, it is preferred to jointly use an auxiliary agent of the hydrolysis regulator (component D), namely an agent for assisting the effect of the hydrolysis regulator (component D) for the purpose of delaying the hydrolysis. Although any known material can be used as such an agent, for example, at least one compound selected from hydrotalcite, an alkaline earth metal oxide, an alkaline earth metal hydroxide, and an alkaline earth metal carbonate is exemplified. A content of the auxiliary agent is preferably 0.1 to 30 parts by weight, more preferably 0.5 to 20 parts by weight, and still more preferably 0.7 to 10 parts by weight based on 100 parts by weight of the hydrolysis regulator (component D).

In the resin composition of the present invention, all of known additives and fillers can be added and used within the range where the effects of the invention are not lost. Examples thereof include a stabilizer, a crystallization promoter, a filler, a release agent, an antistatic agent, a plasticizer, an impact resistance-improving agent, a terminal-sealing agent, and the like.

Incidentally, from the viewpoint that the effects of the invention are not lost, with respect to the additives, it is important to not use a component which promotes the decomposition of the aliphatic polyester containing, as a main component, a water-soluble monomer (component C), for example, a phosphoric acid component, a phosphite-based additive which is decomposed in the resin composition to generate a phosphoric acid component, or the like, or decrease its amount as far as possible, or to reduce influences thereof by taking a method, such as deactivation, etc. For example, a method of using a component capable of achieving deactivation or retardation together with the hydrolysis regulator (component D), or the like can be suitably adopted.

<Stabilizer>

The resin composition of the present invention can contain a stabilizer, and all of the stabilizers described in the foregoing first invention of the present application can be used. Its use amount is also the same.

<Crystallization Promoter>

The resin composition of the present invention can contain an organic or inorganic crystallization accelerator, and all of the crystallization promoters described in the foregoing first invention of the present application can be used. Its use amount is also the same.

<Filler>

The resin composition of the present invention can contain an organic or inorganic filler, and all of the fillers described in the foregoing first invention of the present application can be used. Its use amount is also the same.

<Release Agent>

The resin composition of the present invention can contain a release agent, and all of the release agents described in the foregoing first invention of the present application can be used. Its use amount is also the same.

<Plasticizer>

The resin composition of the present invention can contain a plasticizer, and all of the plasticizers described in the foregoing first invention of the present application can be used. Its use amount is also the same.

<Impact Resistance-Improving Agent>

The resin composition of the present invention can contain an impact resistance-improving agent, and all of the impact resistance-improving agents described in the foregoing first invention of the present application can be used. Its use amount is also the same.

<Others>

In the resin composition of the present invention, the other components described in the foregoing first invention of the present application (e.g., a thermosetting resin, a flame retardant, a dye, a pigment, a colorant, a slidability-improving agent, etc.) can be used within the range where the gist of the present invention is not deviated.

<Molded Article>

A molded article made of the resin composition of the present invention can be formed by means of injection molding, extrusion molding, vacuum or pressure molding, blow molding, or the like. Examples of the molded article include a pellet, a fiber, a textile, a fiber structure, a film, a sheet, a sheet nonwoven fabric, and the like.

In producing the molded article made of the resin composition of the present invention, all of the methods described in the foregoing first invention of the present application can be adopted, and conditions thereof are also the same.

The resin composition of the present invention can be used as a pulverized chip or a powder by using, as a raw material, the above-exemplified molded article or other molded article obtained by a known molding method. As for such a pulverized chip or powder, a material obtained by a conventionally known method including a pulverization method, a shredding method, a cutting method, and a reprecipitation method using a solvent, and a subsequent particle size classification method can be suitably used.

The pulverized chip or powder of the present invention can be used alone, and it can also be used in combination with a molded article of other form or other material, such as a resin, a metal compound, etc.

If desired, the molded article of the present invention can be covered by using a solid material, such as other resins, metal compounds, etc., or a liquid material, such as organic solvents, oils, gels, etc. In that case, in order to achieve the target decomposition performance, it is preferred to adjust the type or thickness of a covering material, adhesiveness to the molded article of the present invention, or the like.

EXAMPLES

The first invention of the present application is hereunder more specifically explained by reference to Examples. The respective physical properties were measured by the following methods.

(1) Weight Average Molecular Weight (Mw) and Number Average Molecular Weight (Mn):

A weight average molecular weight and a number average molecular weight of a polymer were measured by means of gel permeation chromatography (GPC) and converted into standard polystyrene.

As for the GPC measurement, the following detector and column were used, chloroform was used as an eluant, and 10

μL of a sample in a concentration of 1 mg/mL (chloroform containing 1% hexafluoroisopropanol) was injected at a temperature of 40° C. and at a flow rate of 1.0 mL/min and measured.

Detector: Differential refractometer (manufactured by Shimadzu Corporation), RID-6A Column: Column in which TSKgel G3000HXL, TSKgel G4000HXL, TSKgel G5000HXL, and TSKguardcolumn HXL-L (all of which are manufactured by Tosoh Corporation) are connected in series, or column in which TSKgel G2000HXL, TSKgel G3000HXL, and TSKguardcolumn HXL-L (all of which are manufactured by Tosoh Corporation) are connected in series.

(2) Carboxyl Group Concentration:

A carboxyl group concentration of each of resin compositions of the Examples was confirmed by means of $^1$H-NMR. ECA600, manufactured by JEOL Ltd. was used for the NMR. The measurement was performed by using deuterochloroform and hexafluoroisopropanol as a solvent and adding hexylamine thereto.

With respect to other samples, each sample was dissolved in purified o-cresol and further dissolved under a nitrogen gas stream, and the solution was titrated with an ethanol solution of 0.05N potassium hydroxide while using Bromocresol Blue as an indicator.

(3) DSC Measurement of Stereocomplex Crystallization Degree [S (%)], Crystal Melting Temperature, and the Like:

Using DSC (manufactured by TA Instruments, TA-2920), in a first cycle, a sample was subjected to temperature elevation to 250° C. at a rate of 10° C./min under a nitrogen gas stream and measured for a glass transition temperature (Tg), a stereocomplex phase polylactic acid crystal melting temperature (Tm*), a stereocomplex phase polylactic acid crystal melting enthalpy (ΔHms), and a homo-phase polylactic acid crystal melting enthalpy (ΔHmh).

The above-described measurement sample was quickly cooled and subsequently subjected to second cycle measurement under the same condition, thereby measuring a crystallization starting temperature (Tc*) and a crystallization temperature (Tc). A stereocomplex crystallization degree (S) is a value determined from the stereocomplex phase and homo-phase polylactic acid crystal melting enthalpies as obtained by the above-described measurement according to the following equation (a).

$$S(\%)=[\Delta Hms/(\Delta Hmh+\Delta Hms)]\times 100 \quad (a)$$

(Here, ΔHms is a melting enthalpy of the stereocomplex phase polylactic acid crystal, and ΔHmh is a melting enthalpy of the homo-phase polylactic acid crystal.)

(4) Water Resistance Evaluation of Hydrolysis Regulator:

(4-1) Water Resistance Evaluation Using Dimethyl Sulfoxide:

2 g of water was added to a system in which 1 g of a sample was dissolved or partially dissolved in 50 mL of dimethyl sulfoxide, the resultant was stirred while refluxing at 120° C. for 5 hours, and thereafter, the obtained dissolved sample proportion was measured by means of HPLC or $^1$H-NMR.

ECA600, manufactured by JEOL Ltd. was used for the NMR. Deuterodimethyl sulfoxide was used as a solvent, and an agent amount after 5 hours was determined from a change amount of the structure (integrated value).

The HPLC was carried out under the following condition, and the agent amount was determined from an area of the agent amount after 5 hours while defining an area of the agent amount at 0 hour as 100%.

Apparatus: Ultra high performance liquid chromatography, "Nexera (registered trademark)", manufactured by Shimadzu Corporation UV detector: Manufactured by Shimadzu Corporation, SPD-20A, 254 nm Column: Manufactured by GL Sciences Inc., Inertsil Ph-3, 4.6 mm×150 mm (or a column equivalent thereto is also usable)

Column temperature: 40° C.

Preparation of sample: A dimethyl sulfoxide solution was diluted 500 times with DMF and used.

Injection amount: 2 μL

Mobile phase: A: methanol, B: water

Flow rate: 1.0 mL/min (0 min: A/B=50/50→10 min: A/B=98/2→kept until 18 min→23 min: A/B=50/50→30 min)

Using the obtained agent amount after 5 hours, the water resistance was determined according to the following equation (ix).

$$\text{Water resistance}(\%)=[(\text{Agent amount after treatment for 5 hours})/(\text{Initial agent amount})]\times 100 \quad (ix)$$

(4-2) Other Water Resistance Evaluation (Exemplifying the Case where the Component B is Dissolved in Tetrahydrofuran):

2 g of water was added to a system in which 1 g of a sample was dissolved in 25 mL of tetrahydrofuran and 25 mL of dimethyl sulfoxide, the resultant was stirred while refluxing at 120° C. for 5 hours, and thereafter, the obtained dissolved sample proportion was measured by means of FT-IR.

The FT-IR was carried out under the following condition, and using areas of one group which does not change by the treatment of the agent (e.g., an alkyl chain portion, etc.) and a carbodiimide group, the agent amount was determined from a quotient of the area of the carbodiimide group and the area of the group which does not change after 5 hours while defining a quotient of the area of the carbodiimide group and the area of the group which does not change at 0 hour as 100.

Using the obtained agent amount after 5 hours, the water resistance was determined according to the foregoing equation (ix).

Apparatus: Manufactured by Thermo Fisher Scientific K.K., "Nicolet (registered trademark) iN10"

Measurement method: Microscopic transmission method

Measurement visual field: 50 μm×50 μm

Resolution: 4 cm$^{-1}$

Measurement wave number: 4,000 to 740 cm$^{-1}$

Cumulative number: 128 times

Preparation of sample: The dissolved sample was placed on a barium fluoride plate to volatize the solvent.

(5) Reactivity Evaluation of Hydrolysis Regulator with Acidic Group:

With respect to a resin composition obtained by using polylactic acid "NW3001D", manufactured by NatureWorks LLC (MW: 150,000, carboxyl group concentration: 22.1 equivalents/ton) as polylactic acid for evaluation and adding it in an amount such that the group of a hydrolysis regulator, reacting with the carboxyl group, was 33.15 equivalents/ton and melt kneading the mixture under a nitrogen atmosphere at a resin temperature of 190° C. and at a rotation rate of 30 rpm for 1 minute by using a Labo Plasto mill (manufactured by Toyo Seiki Seisaku-Sho, Ltd.), a carboxyl group concentration was measured, and the reactivity with an acidic group was determined according to the following equation (x).

$$\text{Reactivity}(\%) = [\{(\text{Carboxyl group concentration of polylactic acid for evaluation}) - (\text{Carboxyl group concentration of resin composition})\}/(\text{Carboxyl group concentration of polylactic acid for evaluation})] \times 100 \qquad (x)$$

(6) Moist Heat Evaluation in High-temperature Hot Water:

A closed melting crucible (manufactured by OM Lab-Tech Co., Ltd., MR-28, capacity: 28 mL) preheated at 110° C. was charged with 300 mg of a resin composition and 12 mL of distilled water and hermetically sealed, and the crucible was allowed to stand within a hot air dryer (manufactured by Koyo Thermo Systems Co., Ltd., KL0-45M,) previously kept at a prescribed temperature (150° C., 170° C., or 190° C.)

After allowing the crucible to stand, a time after the crucible was allowed to stand in the hot air dryer until the temperature in the interior of the crucible reached a prescribed test temperature was defined as a point of time of starting the test, at a point of time when a fixed period of time elapsed from this point of time of starting the test, the crucible was taken out from the hot air dryer.

The crucible taken out from the hot air dryer was air-cooled for 20 minutes and then cooled to ordinary temperature for 10 minutes by means of water cooling, and thereafter, the crucible was opened to recover the sample and water in the interior of the crucible. The sample and water in the interior of the crucible were subjected to filtration using a filter paper (in conformity with JIS P3801:1995, class 5A); the resin composition remaining on the filter paper was dried at 60° C. under a vacuum of 133.3 Pa or less for 3 hours; thereafter, the weight of the resin composition and the carboxyl group concentration were measured. The weight was determined according to the following equation (xi).

$$\text{Weight}(\%) = [(\text{Weight of resin composition after treatment for a fixed period of time})/(\text{Weight of resin composition at the initial stage})] \times 100 \qquad (xi)$$

A weight average molecular weight of the resin composition obtained by the treatment was measured, and a molecular weight retention rate was evaluated using a weight average molecular weight before the treatment.

(7) Purity Evaluation of bis(2,6-diisopropylphenyl)carbodiimide:

A purity of bis(2,6-diisopropylphenyl)carbodiimide was measured by means of HPLC. The HPLS was carried out under the following condition, and the purity was determined from an area.

LC main body: LC20A (manufactured by Shimadzu Corporation)
Column: Develosil ODS-MG-3
Column temperature: 40° C.
Detection wavelength: 254 nm
Flow rate: 0.2 mL/min
Preparation of sample: A sample was diluted with acetonitrile and used.
Injection amount: 1 μL
Mobile phase: A: water, B: acetonitrile
Gradient condition:
Time 0→1→15→30 (min)
Bconc.: 60→60→100→100(%)

(8) Purity Evaluation of bis(2,6-diisopropylphenyl)carbodiimide (Measurement of Contents of a Compound Represented by the Foregoing Chemical Formula (4) and a Compound Represented by the Foregoing Chemical Formula (5)):

Other compounds contained in bis(2,6-diisopropylphenyl)carbodiimide to be applied to a resin composition were measured by means of $^1$H-NMR. ECA600, manufactured by JEOL Ltd. was used for the NMR. Deuterochloroform was used as a solvent. A total sum of the contents of the compound represented by the foregoing chemical formula (4) and the compound represented by the foregoing chemical formula (5) was calculated from an integrated value of the sample.

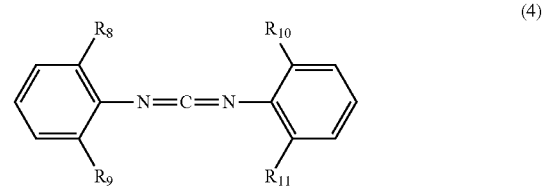

(4)

(In the formula, each of $R_8$ to $R_{11}$ is an aliphatic group having 3 carbon atoms, and at least one of them is a propyl group, with the other group or groups being an isopropyl group.)

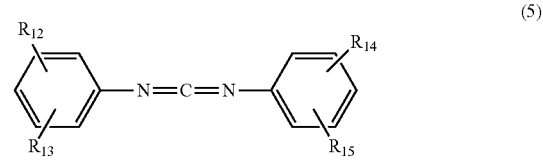

(5)

(In the formula, each of $R_{12}$ to $R_{15}$ is an aliphatic group having 3 carbon atoms, and at least one group of them is substituted on a position other than the ortho position.)

In the case where a peak derived from the compound represented by the foregoing chemical formula (4) or the compound represented by the foregoing chemical formula (5) could not be detected, its content is expressed as "less than 0.1%".

(9) Moist Heat Evaluation in Warm Water:

After treating a sample under a condition at 80° C. and 95% RH for 100 hours by a constant temperature and humidity machine, a weight average molecular weight of the resulting sample was measured, and a molecular weight retention rate was evaluated using a weight average molecular weight before the treatment.

Compounds used in the present Examples are hereunder explained.

<Resin Containing, as a Main Component, a Water-Soluble Monomer and Having Autocatalysis (Component A)>

The following polylactic acids were produced and used as the resin containing, as a main component, a water-soluble monomer and having autocatalysis (component A).

Production Example 1

Poly(L-Lactic Acid) Resin

To 100 parts by weight of L-lactide (manufactured by Musashino Chemical Laboratory, Ltd., optical purity: 100%), 0.005 parts by weight of tin octylate was added; the contents were allowed to react with each other under a nitrogen atmosphere at 180° C. for 2 hours by a reactor equipped with a stirring blade; phosphoric acid of 1.2 time equivalent to the tin octylate was added; and thereafter, the remaining lactide was removed at 13.3 Pa, followed by chipping, thereby obtaining a poly(L-lactic acid) resin.

The obtained poly(L-lactic acid) resin had a weight average molecular weight of 152,000, a melting enthalpy (ΔHmh) of 49 J/g, a melting point (Tmh) of 175° C., a glass transition point (Tg) of 55° C., and a carboxyl group concentration of 13 equivalents/ton.

Production Example 2

Poly(D-lactic Acid) Resin

The same operations as those in Production Example 1 were followed, except that D-lactide (manufactured by Musashino Chemical Laboratory, Ltd., optical purity: 100%) was used in place of the L-lactide in Production Example 1, thereby obtaining a poly(D-lactic acid) resin.

The obtained poly(D-lactic acid) resin had a weight average molecular weight of 151,000, a melting enthalpy (ΔHmh) of 48 J/g, a melting point (Tmh) of 175° C., a glass transition point (Tg) of 55° C., and a carboxyl group concentration of 14 equivalents/ton.

Production Example 3

Stereocomplex Polylactic Acid (A1)

100 parts by weight in total of a polylactic acid resin consisting of 50 parts by weight of the poly(L-lactic acid) resin and 50 parts by weight of the poly(D-lactic acid) resin obtained in Production Examples 1 and 2, respectively and 0.04 parts by weight of phosphoric acid-2,2'-methylenebis (4,6-di-tert-butylphenyl) sodium ("ADEKASTAB (registered trademark)" NA-11, manufactured by ADEKA Corporation) were mixed by a blender; thereafter, the mixture was dried at 110° C. for 5 hours and then supplied into a vent type double-screw extruder having a diameter of 30 mmφ (manufactured by The Japan Steel Works, LTD., TEX30XSST); and the resultant was melt extruded at a cylinder temperature of 250° C., a screw rotation rate of 250 rpm, a discharge amount of 5 kg/h, and a vent reduced pressure of 3 kPa, followed by pelletization, thereby obtaining stereocomplex polylactic acid (A1).

The obtained stereocomplex polylactic acid resin (A1) had a weight average molecular weight of 130,000, a melting enthalpy (ΔHms) of 56 J/g, a melting point (Tms) of 220° C., a glass transition point (Tg) of 58° C., a carboxyl group concentration of 16 equivalents/ton, and a stereocomplex crystallization degree (S) of 100%.

A2: Polylactic acid "NW3001D", manufactured by Nature-Works LLC (MW: 150,000, carboxyl group concentration: 22.1 equivalents/ton)

<Hydrolysis Regulator (Component B)>

The following additives were used as the hydrolysis regulator (component B).

B1: DIPC (carbodiimide compound, manufactured by Kawaguchi Chemical Industry Co., Ltd.)

The purity of bis(2,6-diisopropylphenyl)carbodiimide is 99.9% or more, and the total sum of the compound represented by the foregoing chemical formula (4) and the compound represented by the foregoing chemical formula (5) is less than 0.1%.

B1': Bis(2,6-diisopropylphenyl)carbodiimide (synthesized by a known method)

The purity of bis(2,6-diisopropylphenyl)carbodiimide is 90.9%, the total sum of the compound represented by the foregoing chemical formula (4) and the compound represented by the foregoing chemical formula (5) is 8.7%, and the content of other impurity component is 0.4%.

B2: "STABAXOL (registered trademark)" P (carbodiimide compound, manufactured by Rhein Chemie)

B3: "CARBODILITE (registered trademark)" LA-1 (carbodiimide compound, manufactured by Nisshinbo Chemical Inc.)

B4: 1,3-Di-p-tolylcarbodiimide (carbodiimide compound, manufactured by Aldrich)

B5: "CELLOXIDE (registered trademark)" 2021P (epoxy compound, manufactured by Daicel Corporation)

B6: BOX-210 (oxazoline compound, manufactured by Takemoto Oil & Fat Co., Ltd.)

The water resistance and the reactivity with an acidic group of each component B are shown in Table 1. Materials in which the water resistance is 95% or more, and the reactivity with an acidic group is 50% or more were judged as "◯" and used for the Examples. The other materials were judged as "X" and used for the Comparative Examples. With respect to B1 and B4 to B6, the water resistance evaluation using dimethyl sulfoxide was performed, and with respect to B2 and B3, the other water resistance evaluation was performed.

Example 1

A1 and B1 were mixed in weight parts shown in Table 2 and melt kneaded under a nitrogen atmosphere at a resin temperature of 230° C. and at a rotation rate of 30 rpm for 1.5 minutes by using a Labo Plasto mill (manufactured by Toyo Seiki Seisaku-Sho, Ltd.), thereby obtaining a resin composition. The obtained resin composition was subjected to moist heat evaluation in high-temperature hot water at 170° C. The evaluation results are shown in Table 2.

Example 2

A resin composition was prepared in the same manner as that in Example 1, except that B1 was changed to B2, and evaluated by the same method. The evaluation results are shown in Table 2.

Comparative Examples 1 to 4

Resin compositions were prepared in the same manner as that in Example 1, except that B1 was changed to B3 to B6, respectively. The evaluation results are shown in Table 2.

Example 3

A resin composition was prepared in the same manner as that in Example 1, except that the amounts of A1 and B1 were changed to weight parts shown in Table 2, respectively, and the obtained resin composition was subjected to moist heat evaluation in high-temperature hot water at 190° C. The evaluation results are shown in Table 2. The molecular weight retention rate evaluated before and after keeping in hot water at 190° C. for 1 hour was 46%.

Example 4

A resin composition was prepared in the same manner as that in Example 3, except that B1 was changed to B2, and evaluated by the same method. The evaluation results are shown in Table 2.

Comparative Examples 5 to 8

Resin compositions were prepared in the same manner as that in Example 3, except that B1 was changed to B3 to B6, respectively. The evaluation results are shown in Table 2.

Example 5

A resin composition was prepared in the same manner as that in Example 1, except that A1 was changed to A2, and the obtained resin composition was subjected to moist heat evaluation in high-temperature hot water at 150° C. The evaluation results are shown in Table 2.

Comparative Example 9

A resin composition was prepared in the same manner as that in Example 5, except that B1 was changed to B3, and evaluated by the same method. The evaluation results are shown in Table 2.

Example 6

A resin composition was prepared in the same manner as that in Example 3; the obtained resin composition was dehumidified and dried at 40° C. for 8 hours and then melted at 230° C.; and the resultant was discharged from a spinneret having an aperture of 0.2 mm and stretched 3.5 times at 65° C., followed by crystallization at 180° C. The obtained fiber was cut by a rotary cutter, thereby obtaining a short fiber having a yarn diameter of 50 μm and a length of 8 mm. This fiber was subjected to moist heat evaluation in high-temperature hot water at 190° C. The evaluation results are shown in Table 2.

Example 7

A fiber was prepared in the same manner as that in Example 6, except that B1 was changed to B2, and evaluated by the same method. The evaluation results are shown in Table 2.

TABLE 1

| Evaluation | Component B | | | | | |
| --- | --- | --- | --- | --- | --- | --- |
|  | B1 | B2 | B3 | B4 | B5 | B6 |
| Water resistance (%) | 100 | 100 | 82.6 | 0 | 100 | 100 |
| Reactivity with acidic group (%) | 85.7 | 73.2 | 87.3 | 84.8 | 5.9 | 26.7 |
| Judgement | ○ | ○ | X | X | X | X |

| | Component A | | Formulation (weight parts) Component B | | | | | | | Shape | Temperature (°C.) of hot water | Carboxyl group concentration of resin composition (eq./t) | | Weight of resin composition (%) | |
| --- | --- | --- | --- | --- | --- | --- | --- | --- | --- | --- | --- | --- | --- | --- | --- |
| | A1 | A2 | B1 | B1' (purified product) | B2 | B3 | B4 | B5 | B6 | | | Hot water treatment 0 h | Hot water treatment 1 h | Hot water treatment 1 h | Hot water treatment 24 h |
| Example 1 | 97.5 | | 2.5 | | | | | | | Pellet | 170 | 0 | 0 | 97 | Less than 1% |
| Example 2 | 97.5 | | | 2.5 | | | | | | Pellet | 170 | 0 | 0 | 99 | Less than 1% |
| Example 3 | 90 | | 10 | | | | | | | Pellet | 190 | 0 | 0 | 99 | Less than 1% |
| Example 4 | 90 | | | 10 | | | | | | Pellet | 190 | 0 | 4.5 | 98 | Less than 1% |
| Example 5 | 97.5 | | 2.5 | | | | | | | Pellet | 150 | 0 | 0 | 100 | Less than 1% |
| Example 6 | 90 | | 10 | | | | | | | Fiber | 190 | 0 | 0 | 92 | Less than 1% |
| Example 7 | 90 | | | 10 | | | | | | Fiber | 190 | 0 | 7.7 | 88 | Less than 1% |
| Example 8 | 90 | | | | 10 | | | | | Pellet | 190 | 0 | 0 | 98 | Less than 1% |
| Example 9 | 90 | | | | | 10 | | | | Pellet | 190 | 0 | 0 | 98 | Less than 1% |
| Comparative Example 1 | 97.5 | | | | 2.5 | | | | | Pellet | 170 | 0 | 83.3 | 98 | Less than 1% |
| Comparative Example 2 | 97.5 | | | | | 2.5 | | | | Pellet | 170 | 0 | 317.9 | 83 | Less than 1% |
| Comparative Example 3 | 97.5 | | | | | | 2.5 | | | Pellet | 170 | 6.3 | 118.7 | 97 | Less than 1% |
| Comparative Example 4 | 97.5 | | | | | | | 2.5 | | Pellet | 170 | 0 | 361.6 | 78 | Less than 1% |
| Comparative Example 5 | 90 | | | | 10 | | | | | Pellet | 190 | 0 | — | Less than 1% | — |
| Comparative Example 6 | 90 | | | | | 10 | | | | Pellet | 190 | 0 | — | Less than 1% | — |
| Comparative Example 7 | 90 | | | | | | | 10 | | Pellet | 190 | 0.6 | — | Less than 1% | — |

-continued

| | Formulation (weight parts) | | | | | | | | | Temper- (%) | Carboxyl group concentration of resin composition (eq./t) | | Weight of resin composition (%) | |
|---|---|---|---|---|---|---|---|---|---|---|---|---|---|---|
| | Component A | | | Component B | | | | | | | | | | |
| | | | | B1' (purified | | | | | | of hot | Hot water | Hot water | Hot water | Hot water |
| | | | | | | | | | | water | treatment | treatment | treatment | treatment |
| | A1 | A2 | B1 | B1' product) | B2 | B3 | B4 | B5 | B6 | Shape | (° C.) | 0 h | 1 h | 1 h | 24 h |
| Comparative Example 8 | 90 | | | | | | | | 10 | Pellet | 190 | 0 | — | Less than 1% | — |
| Comparative Example 9 | 97.5 | | | 2.5 | | | | | | Pellet | 150 | 0 | 277.4 | 97 | Less than 1% |

* In the resin composition of Example 3, the molecular weight retention rate evaluated before and after keeping in hot water at 190° C. for 1 hour was 46%.
In the resin composition of Example 8, the molecular weight retention rate evaluated before and after keeping in hot water at 190° C. for 1 hour was 47%.
In the resin composition of Example 9, the molecular weight retention rate evaluated before and after keeping in hot water at 190° C. for 1 hour was 32%.

From these results, it is understood that in the case of using, as the hydrolysis regulator, B1 and B2 each satisfying both the water resistance and the reactivity with an acidic group, the resin composition can realize the desired performance in high-temperature hot water, namely the performance in which the resin composition is quickly decomposed after keeping the weight and shape of the resin in high-temperature hot water for a fixed period of time. In addition, it is understood that in the case of using B3 to B6, each of which does not satisfy at least either the water resistance or the reactivity with an acidic group, the decomposition of the resin composition is fast, so that the satisfactory performance is not obtained.

Incidentally, in the Examples, with respect to the materials in which the weight thereof is less than 1% after the treatment in high-temperature hot water, on the basis of judgement that the decomposition thoroughly proceeded, the measurement of the carboxyl group concentration and the moist heat evaluation in high-temperature hot water for a long time were not performed. The corresponding portions in Table 2 are designated as "–".

Example 8

100 g of B1' was added to 200 mL of methanol, completely dissolved at 60° C., and then cooled to room temperature. A deposited crystal was recovered by filtration and dried to obtained a purified product. The purity of bis(2,6-diisopropylphenyl)carbodiimide was 99.9% or more, and the total sum content of the compound represented by the foregoing chemical formula (4) and the compound represented by the foregoing chemical formula (5) was less than 0.1%.

A resin composition was prepared in the same manner as that in Example 3, except that the obtained purified product was used in place of B1, and evaluated by the same method. The evaluation results are shown in Table 2. The molecular weight retention rate was 47%.

Example 9

A resin composition was prepared in the same manner as that in Example 3, except that B1 was changed to B1', and evaluated by the same method. The evaluation results are shown in Table 2. The molecular weight retention rate was 32%.

Reference Example 1

The resin composition prepared in Example 3 was treated under a condition at 80° C. and 95% RH for 100 hours by a constant temperature and humidity machine. The molecular weight retention rate after the treatment was 91%.

Reference Example 2

A resin composition was prepared in the same manner as that in Example 3, except that B1 was changed to B1', and the obtained resin composition was treated under a condition at 80° C. and 95% RH for 100 hours by a constant temperature and humidity machine. The molecular weight retention rate after the treatment was 92%.

From these results, it is understood that in the case where the component B is bis(2,6-diisopropylphenyl)carbodiimide, when the total sum content of the compound represented by the foregoing chemical formula (4) and the compound represented by the foregoing chemical formula (5) is small, in particular, the effect when used in high-temperature hot water according to the present invention is enhanced. It is understood that in view of the fact that it was also confirmed that this enhancement of the effect is not exhibited as a meaningful difference in warm water at 80° C., this is an important factor in the application with which the present invention is mainly concerned.

The second invention of the present application is hereunder more specifically explained by reference to Examples. The respective physical properties were measured by the following methods.

(10) Weight Average Molecular Weight (Mw) and Number Average Molecular Weight (Mn):

A weight average molecular weight and a number average molecular weight of a polymer were measured by means of gel permeation chromatography (GPC) and converted into standard polystyrene.

As for the GPC measurement, the following detector and column were used, chloroform was used as an eluant, and 10 μL of a sample in a concentration of 1 mg/mL (chloroform containing 1% hexafluoroisopropanol) was injected at a temperature of 40° C. and at a flow rate of 1.0 mL/min and measured.

Detector: Differential refractometer (manufactured by Shimadzu Corporation), RID-6A Column: Column in which TSKgel G3000HXL, TSKgel G4000HXL, TSKgel G5000HXL, and TSKguardcolumn HXL-L (all of which are manufactured by Tosoh Corporation) are connected in series, or column in which TSKgel G2000HXL, TSKgel G3000HXL, and TSKguardcolumn HXL-L (all of which are manufactured by Tosoh Corporation) are connected in series.

(11) Carboxyl Group Concentration:

A sample was dissolved in purified o-cresol and further dissolved under a nitrogen gas stream, and the solution was titrated with an ethanol solution of 0.05N potassium hydroxide while using Bromocresol Blue as an indicator.

(12) Reactivity Evaluation with Acidic Group of Hydrolysis Regulator:

With respect to a resin composition obtained by using polylactic acid "NW3001D", manufactured by NatureWorks LLC (MW: 150,000, carboxyl group concentration: 24.1 equivalents/ton) as polylactic acid for evaluation, adding 5 parts by weight of a hydrolysis regulator to 95 parts by weight of the polylactic acid, and melt kneading the mixture under a nitrogen atmosphere at a resin temperature of 200° C. and at a rotation rate of 30 rpm for 2 minutes by using a Labo Plasto mill (manufactured by Toyo Seiki Seisaku-Sho, Ltd.), a carboxyl group concentration after treatment in a 15% hydrochloric acid aqueous solution at 100° C. for 3 hours was evaluated, a carboxy group concentration of the polylactic acid for evaluation was similarly measured after treatment in a 15% hydrochloric acid aqueous solution at 100° C. for 3 hours, and the reactivity with an acidic group was determined according to the following equation (xii).

Reactivity(%)=[{(Carboxyl group concentration of polylactic acid for evaluation after treatment in 15% hydrochloric acid aqueous solution at 100° C. for 3hours)−(Carboxyl group concentration of resin composition after treatment in 15% hydrochloric acid aqueous solution at 100° C. for 3hours)}/(Carboxyl group concentration of polylactic acid for evaluation after treatment in 15% hydrochloric acid aqueous solution at 100° C. for 3hours)]×100  (xii)

(13) Decomposability Evaluation in Acidic Aqueous Solution:

A glass-made screw-capped test tube (manufactured by Maruemu Corporation, NN-13, capacity: about 5 mL) was charged with 50 mg of a resin composition (one having been previously crystallized by a heat treatment at 110° C. for 10 minutes and having a chip-like shape of 0.5 mm to 2 mm in each side) and mL of a 15% hydrochloric acid aqueous solution and hermetically sealed. The 15% hydrochloric acid aqueous solution was prepared by diluting hydrochloric acid (manufactured by Wako Pure Chemical Industries, Ltd., Special grade, 35 to 37%) with distilled water and subjected to neutralization titration with a sodium hydroxide aqueous solution standard liquid, thereby confirming the concentration.

In the case where the test temperature was 100° C. or lower, the above-described test tube was allowed to stand within a hot air dryer (manufactured by Toyo Seiki Seisaku-Sho, Ltd., FC-410) having been kept at a prescribed temperature in advance. After elapsing a prescribed time, the test tube was taken out and cooled to ordinary temperature (25° C.) in a hermetically sealed state of the test tube by means of water cooling.

In the case where the test temperature was higher than 100° C. and 130° C. or lower, the above-described test tube was allowed to stand within a pressure cooker (manufactured by Espec Corporation, HAST Chamber EHS-221M). After the temperature within the pressure cooker reached the test temperature, and a prescribed time elapsed, the temperature decrease was commenced. After 10 minutes, the test tube was taken out from the pressure cooker and cooled to ordinary temperature (25° C.) in a hermetically sealed state of the test tube by means of water cooling.

After cooling the test tube to ordinary temperature (25° C.), the test tube was opened, the resin composition in the interior was filtered using a glass filter (manufactured by Sibata Scientific Technology Ltd., 3GP100, pore size: 40 to 100 μm), and the resin composition remaining on the glass filter was washed with a large amount of distilled water. The washed resin composition was dried at ordinary temperature (25° C.) under a vacuum of 133.3 Pa or less for 1 hour, and thereafter, the weight of the resin composition was measured. The weight of the water-insoluble matter was calculated according to the following equation (xiii).

Weight of water-insoluble matter(%)=[(Weight of resin composition recovered by filtration after decomposition test)÷(Weight of resin composition before decomposition test)]×100  (xiii)

With respect to the resin composition after the decomposition test, the weight average molecular weight (Mw) was measured by means of gel permeation chromatography (GPC), and its value was designated as Mw1. Mw of the resin composition before the above-described decomposition test was measured by means of GPC, and its value is designated as Mw0. The weight average molecular weight retention rate was calculated according to the following equation (xiv).

Weight average molecular weight retention rate(%)= [$Mw1/Mw0$]×100  (xiv)

Compounds used in the present Examples are hereinunder explained.

<Aliphatic Polyester Containing, as a Main Component, a Water-Soluble Monomer (Component C)>

"NW3001D", manufactured by NatureWorks LLC (MW: 150,000, carboxyl group concentration: 24.1 equivalents/ton) was used as the aliphatic polyester containing, as a main component, a water-soluble monomer (component C).

<Hydrolysis Regulator (Component D)>

The following additives were used as the hydrolysis regulator (component D).

D1: Carbodiimide compound CC1 described in Production Example 1

D2: "CARBODILITE (registered trademark)" LA-1 (carbodiimide compound, manufactured by Nisshinbo Chemical Inc.)

D3: DIPC (carbodiimide compound, manufactured by Kawaguchi Chemical Industry Co., Ltd.)

D4: "CELLOXIDE (registered trademark)" 2021P (epoxy compound, manufactured by Daicel Corporation)

D5: BOX-210 (oxazoline compound, manufactured by Takemoto Oil & Fat Co., Ltd.)

The reactivity with an acidic group of each hydrolysis regulator (component D) is shown in Table 3. Materials in which the reactivity with an acidic group is 30% or more were judged as "○" and used for the Examples. The other materials were judged as "X" and used for the Comparative Examples. Incidentally, the case where the value of the reactivity was a minus value was expressed as "0" and judged as "X".

Production Example 4

Synthesis of Hydrolysis Regulator (D1)

In a reaction apparatus equipped with a stirring device and a heating device, o-nitrophenol (0.11 moles), pentaerythrityl tetrabromide (0.025 moles), potassium carbonate (0.33 moles), and 200 mL of N,N-dimethylformamide were charged under an $N_2$ atmosphere; after reaction at 130° C. for 12 hours, DMF was removed under reduced pressure; and the obtained solid was dissolved in 200 mL of dichloromethane, followed by liquid separation with 100 mL of water three times. An organic layer was dehydrated over 5 g of sodium sulfate, and the dichloromethane was removed under reduced pressure to obtain an intermediate product D (nitro body).

Subsequently, the intermediate product D (0.1 moles), 5% palladium on carbon (Pd/C) (2 g), and 400 mL of ethanol/dichloromethane (70/30) were charged in a reaction apparatus equipped with a stirring device; hydrogen substitution was performed 5 times; the contents were allowed to react at 25° C. in a state where hydrogen was always supplied; and when a decrease of hydrogen varnished, the reaction was finished. The PD/C was recovered, and the mixed solvent was removed to obtain an intermediate product E (amine body).

Subsequently, in a reaction apparatus equipped with a stirring device, a heating device, and a dropping funnel, triphenylphosphine dibromide (0.11 moles) and 150 mL of 1,2-dichloroethane were charged under an $N_2$ atmosphere and stirred. A solution of the intermediate product E (0.025 moles) and triethylamine (0.25 moles) dissolved in 50 mL of 1,2-dichloroethane was gradually added dropwise thereto. After completion of the dropwise addition, the mixture was allowed to react at 70° C. for 5 hours. Thereafter, the reaction solution was filtered, and the filtrate was subjected to liquid separation with 100 mL of water 5 times. An organic phase was dehydrated over 5 g of sodium sulfate, and the 1,2-dichloroethane was removed under reduced pressure to obtain an intermediate product F (trimethylphosphine body).

Subsequently, in a reaction apparatus equipped with a stirring device and a dropping funnel, di-tert-butyl dicarbonate (0.11 moles), N,N-dimethyl-4-aminopyridine (0.055 moles), and 150 mL of dichloromethane were charged under an $N_2$ atmosphere and stirred. 100 mL of dichloromethane having the intermediate product F (0.025 moles) dissolved therein was gradually added dropwise thereto. After the dropwise addition, the mixture was allowed to react for 12 hours. Thereafter, the dichloromethane was removed, and the obtained solid was purified to obtain a compound (CC1, MW=516) represented by the following formula. A structure of CC1 was confirmed by means of NMR and IR.

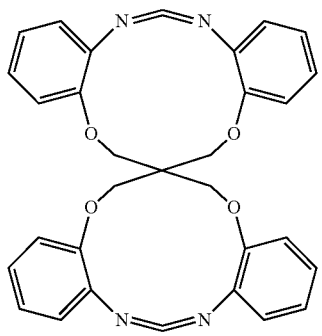 [SMILES: C1=Nc2ccccc2OCC2(COc3ccccc3N=1)COc1ccccc1N=C=Nc1ccccc1OC2]

Examples 10 and 11

C1 and D1 were mixed in weight parts shown in Table 4 and melt kneaded under a nitrogen atmosphere at a resin temperature of 200° C. and at a rotation rate of 30 rpm for 2 minutes by using a Labo Plasto mill (manufactured by Toyo Seiki Seisaku-Sho, Ltd.), thereby obtaining a resin composition. The obtained resin composition was subjected to a decomposition test in a 15% hydrochloric acid aqueous solution at 100° C. The test results are shown in Table 4.

Examples 12 to 14

Resin compositions were prepared by mixing the components in weight parts shown in Table 5 in the same manner as that in Example, except that D1 was changed to D2 and D4, respectively, and evaluated by the same method. The evaluation results were shown in Table 5.

Comparative Example 10

C1 was used as it was and evaluated in the same method as that in Example 1. The evaluation results are shown in Table 4.

Comparative Examples 11 to 12

Resin compositions were prepared by mixing the components in weight parts shown in Table 3 in the same manner as that in Example 10, except that D1 was changed to D3 and D5, respectively, and evaluated by the same method. The evaluation results were shown in Table 4.

Examples 15 to 19 and Comparative Examples 13 to 15

Resin compositions in formations shown in Table 4 were prepared in the same manners as those in Examples 10 to 14 and Comparative Examples 10 to 12, respectively, except that the test temperature was changed from 100° C. to 120° C., and evaluated by the same method. The evaluation results were shown in Table 4.

TABLE 3

| | Component D | | | | |
|---|---|---|---|---|---|
| Evaluation | D1 | D2 | D3 | D4 | D5 |
| Reactivity with acidic group (%) | 41.7 | 35.2 | 2.4 | 39.4 | 0 |
| Judgement | ○ | ○ | x | ○ | x |

TABLE 4

| | | | Comparative Example 10 | Example 10 | Example 11 | Example 12 | Example 13 | Comparative Example 11 | Example 14 | Comparative Example 12 |
|---|---|---|---|---|---|---|---|---|---|---|
| Formulation (weight parts) | Component C | C1 | 100 | 98 | 95 | 98 | 95 | 95 | 95 | 95 |
| | Component D | D1 | | 2 | 5 | | | | | |
| | | D2 | | | | 2 | 5 | | | |
| | | D3 | | | | | | | | 5 |

TABLE 4-continued

|  |  | Comparative Example 10 | Example 10 | Example 11 | Example 12 | Example 13 | Comparative Example 11 | Example 14 | Comparative Example 12 |
|---|---|---|---|---|---|---|---|---|---|
|  | D4 |  |  |  |  |  |  | 5 |  |
|  | D5 |  |  |  |  |  |  |  | 5 |
| Decomposition test temperature (° C.) |  | 100 | 100 | 100 | 100 | 100 | 100 | 100 | 100 |
| Initial weight average molecular weight Mw0 |  | 149568 | 156769 | 165591 | 162644 | 162786 | 144627 | 140604 | 140309 |
| Weight average molecular weight retention | 3 hours | 24 | 96 | 106 | 78 | 86 | 56 | 75 | 16 |
| rate after decomposition test in hydrochloric | 6 hours | 7 | 90 | 104 | 74 | 92 | 39 | 59 | Less than 2 |
| acid aqueous solution (%) | 12 hours | Less than 2 | 61 | 94 | 66 | 88 | Less than 2 | 34 | Less than 2 |
| Weight of water-insoluble matter after 48 hours of decomposition test in hydrochloric acid aqueous solution |  | 0 | 0 | 0 | 1 | 5 | 0 | 2 | 0 |

TABLE 5

|  |  |  | Comparative Example 13 | Example 15 | Example 16 | Example 17 | Example 18 | Comparative Example 14 | Example 19 | Comparative Example 15 |
|---|---|---|---|---|---|---|---|---|---|---|
| Formulation (weight parts) | Component C | C1 | 100 | 98 | 95 | 98 | 95 | 95 | 95 | 95 |
|  | Component D | D1 |  | 2 | 5 |  |  |  |  |  |
|  |  | D2 |  |  |  | 2 | 5 |  |  |  |
|  |  | D3 |  |  |  |  |  | 5 |  |  |
|  |  | D4 |  |  |  |  |  |  | 5 |  |
|  |  | D5 |  |  |  |  |  |  |  | 5 |
| Decomposition test temperature (° C.) |  | 120 | 120 | 120 | 120 | 120 | 120 | 120 | 120 |
| Initial weight average molecular weight Mw0 |  | 149568 | 156769 | 165591 | 162644 | 162786 | 144627 | 140604 | 140309 |
| Weight average molecular weight retention | 0.1 hours | 39 | 94 | 98 | 80 | 87 | 52 | 80 | 32 |
| rate after decomposition test in hydrochloric | 0.5 hours | 14 | 81 | 92 | 58 | 80 | 23 | 64 | 12 |
| acid aqueous solution (%) | 1 hour | Less than 2 | 64 | 86 | 52 | 84 | Less than 2 | 55 | Less than 2 |
| Weight of water-insoluble matter after 48 hours of decomposition test in hydrochloric acid aqueous solution |  | 0 | 0 | 0 | 1 | 3 | 0 | 0 | 0 |

From these results, it is understood that in the case of using, as the hydrolysis regulator, D1, D2, and D4, each satisfying the reactivity with an acidic group, the resin composition can realize the desired performance in hot water under a chemically severe condition, such as an acidic or basic condition, etc., namely the performance in which after keeping the weight average molecular weight of the resin composition and keeping the weight and shape in hot water under a chemically severe condition, such as an acidic or basic condition, etc., for a fixed period of time, the resin is quickly decomposed.

In addition, it is understood that in the case of using D3 and D4, each of which does not satisfy the reactivity with an acidic group, the decomposition of the resin composition is fast, so that the satisfactory performance is not obtained.

The invention claimed is:

1. A resin composition including an aliphatic polyester mainly derived from water-soluble monomers (component C) and a hydrolysis regulator having reactivity with an acidic group in a 15% hydrochloric acid aqueous solution at 100° C. of 30% or more (component D), the resin composition satisfying any one of the following J1 to J2:

J1: In the 15% hydrochloric acid aqueous solution at 100° C., after 6 hours, a weight average molecular weight retention rate of the resin composition is 50% or more, and after 24 hours, a weight of a water-insoluble matter of the resin composition is 50% or less; and J2: In the 15% hydrochloric acid aqueous solution at 120° C., after 1 hour, a weight average molecular weight retention rate of the resin composition is 50% or more, and after 24 hours, a weight of a water-insoluble matter of the resin composition is 50% or less;

wherein the hydrolysis regulator (component D) comprises 3,4-epoxycyclohexenylmethyl-3',4'-epoxycyclohexene carboxylate.

2. The resin composition according to claim 1, wherein after 72 hours, the weight of the water-insoluble matter of the resin composition is 1% or less.

3. The resin composition according to claim 1, wherein a main chain of the aliphatic polyester is composed mainly of a lactic acid unit represented by the following formula (1):

4. A molded article comprising the resin composition according to claim 1.

5. The resin composition according to claim 2, wherein a main chain of the component A is composed mainly of a lactic acid unit represented by the following formula (1):

* * * * *